United States Patent
Liu et al.

(10) Patent No.: US 8,442,566 B2
(45) Date of Patent: May 14, 2013

(54) COORDINATED MULTIPOINT (COMP) JOINT TRANSMISSION USING CHANNEL INFORMATION FEEDBACK AND HIGHER RANK DEDICATED BEAM-FORMING

(75) Inventors: Lingjia Liu, Plano, TX (US); Jianzhong Zhang, Irving, TX (US); Bruno Clerckx, Seoul (KR); Jin-Kyu Han, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 598 days.

(21) Appl. No.: 12/631,565

(22) Filed: Dec. 4, 2009

(65) Prior Publication Data

US 2010/0173660 A1 Jul. 8, 2010

Related U.S. Application Data

(60) Provisional application No. 61/204,487, filed on Jan. 7, 2009.

(51) Int. Cl.
*H04W 72/04* (2009.01)
*H04W 56/00* (2009.01)

(52) U.S. Cl.
USPC ...... 455/509; 455/452.1; 455/517; 455/67.11

(58) Field of Classification Search .................. 455/446, 455/447, 448, 449, 452.1, 452.2, 464, 515, 455/524, 525, 67.11, 69, 68, 509, 517, 550.1; 370/312, 336, 328, 282, 329, 252
See application file for complete search history.

(56) References Cited

U.S. PATENT DOCUMENTS

| | | | |
|---|---|---|---|
| 2010/0027456 A1* | 2/2010 | Onggosanusi et al. | 370/312 |
| 2010/0027471 A1 | 2/2010 | Palanki et al. | |
| 2010/0272074 A1* | 10/2010 | Cheng et al. | 370/336 |
| 2011/0038310 A1* | 2/2011 | Chmiel et al. | 370/328 |
| 2011/0222501 A1* | 9/2011 | Kim et al. | 370/329 |

FOREIGN PATENT DOCUMENTS

EP 1901465 A1 3/2008

OTHER PUBLICATIONS

International Search Report dated Sep. 1, 2010 in connection with International Application No. PCT/KR2010/000112.
Stefan Parkvall et al.: "LTE Advanced-Evolving LTE towards IMT-Advanced", In: VTC 2008, Fall, IEEE, Sep. 21-24, 2008, pp. 1-5.

* cited by examiner

*Primary Examiner* — John J Lee

(57) ABSTRACT

A subscriber station is provided. The subscriber station comprises a receiver configured to listen for downlink control information for coordinated multipoint (CoMP) joint transmission only from an anchor cell, and to receive the downlink control information for CoMP joint transmission from the anchor cell.

22 Claims, 13 Drawing Sheets

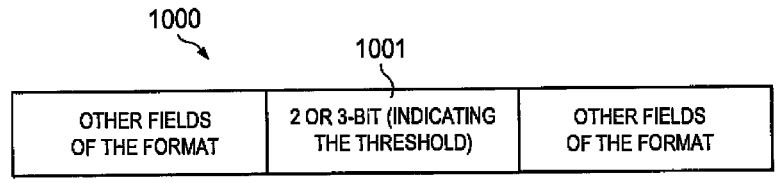
FIG. 10
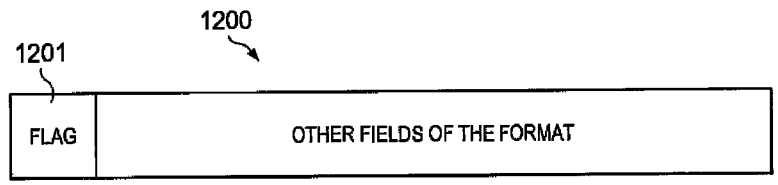
FIG. 11
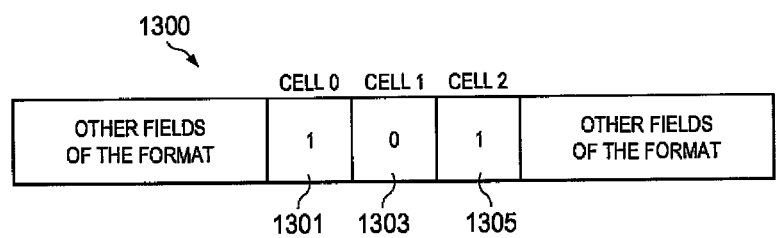
FIG. 12
FIG. 13

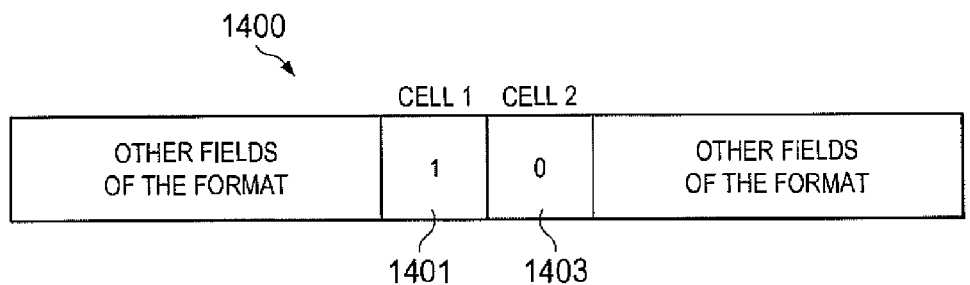
FIG. 14
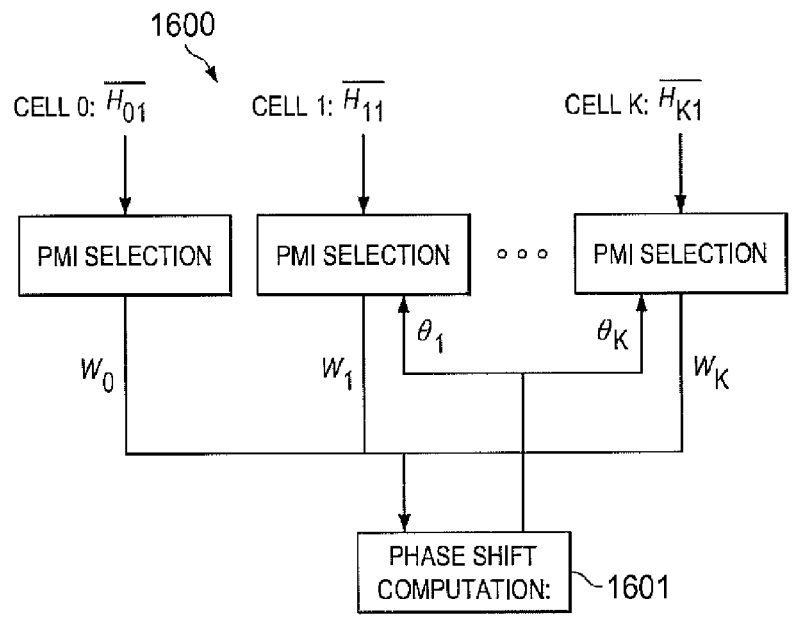
FIG. 15
FIG. 16

1700
| PHASE SHIFT INDEX | VALUE FOR $\theta_I$ |
|---|---|
| 0 | 0 |
| 1 | $\pi/2$ |
| 2 | $\pi$ |
| 3 | $3\pi/2$ |
— 1701
— 1703
— 1705
— 1707
FIG. 17
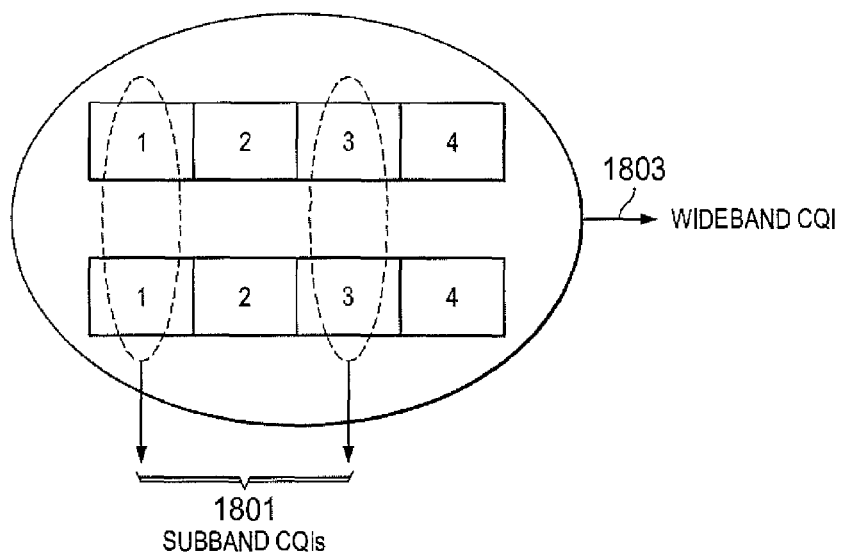
1803 → WIDEBAND CQI
1801 SUBBAND CQIs
FIG. 18
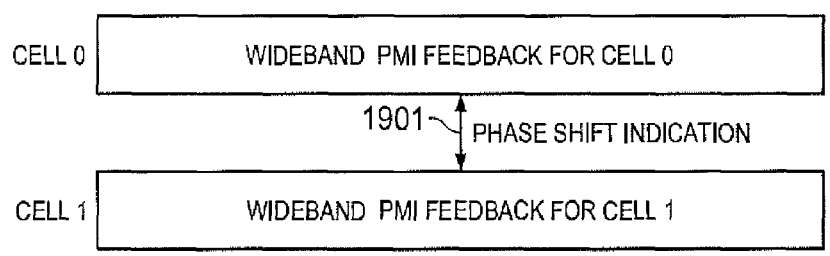
1901 — PHASE SHIFT INDICATION
FIG. 19A

COORDINATED MULTIPOINT (COMP) JOINT TRANSMISSION USING CHANNEL INFORMATION FEEDBACK AND HIGHER RANK DEDICATED BEAM-FORMING

CROSS-REFERENCE TO RELATED APPLICATION(S) AND CLAIM OF PRIORITY

The present application is related to U.S. Provisional Patent No. 61/204,487, filed Jan. 7, 2009, entitled "CHANNEL INFORMATION FEEDBACK AND HIGHER RANK DEDICATED BEAM-FORMING FOR COORDINATED MULTIPOINT TRANSMISSION (CoMP)". Provisional Patent No. 61/204,487 is assigned to the assignee of the present application and is hereby incorporated by reference into the present application as if fully set forth herein. The present application hereby claims priority under 35 U.S.C. §119(e) to U.S. Provisional Patent No. 61/204,487.

TECHNICAL FIELD OF THE INVENTION

This application relates generally to wireless communication and, more specifically, to coordinated multipoint (CoMP) joint transmission.

BACKGROUND OF THE INVENTION

In a wireless communications network, multiple cells or base stations (also referred to as enhanced node Bs or "eNBs") use frequency bands and standardized codebooks for precoding transmission to their respective subscriber stations (SSs) or user equipments (UEs) using multiple transmit antennas. "Inter-cell interference" occurs when the signals from the multiple cells or base stations interfere with one another, and constrains the throughput of the wireless network.

Typically, a subscriber station would transmit a message to its serving base station indicating that the subscriber station is experiencing high interference from an interfering base station. The serving base station would then send an indication message to the interfering base station requesting that the interfering base station reduce the transmission power over particular resource blocks. By reducing the transmission power at the interfering base station, the interference experienced by the subscriber station is reduced.

However, this approach to reducing interference is not desirable if the subscriber station also is a cell-edge user. In such a situation, reducing the transmission power at the interfering base station would actually result in poor performance of a subscriber station that is at a cell edge.

SUMMARY OF THE INVENTION

A subscriber station is provided. The subscriber station comprises a receiver configured to listen for downlink control information for coordinated multipoint (CoMP) joint transmission only from an anchor cell, and to receive the downlink control information for CoMP joint transmission from the anchor cell.

For use in a wireless communications network, a subscriber station is provided. The subscriber station comprises a receiver configured to receive a first indication of an active set of cells from an anchor cell, and a transmitter configured to transmit information related to the active set of cells to the anchor cell. The receiver is further configured to receive a second indication of a subset of the active set from the anchor cell through the physical downlink control channel (PDCCH), the subset of the active cells being determined by the anchor cell. The transmitter is further configured to transmit information channel related information for the subset of the active cells to the anchor cell.

A transmitting base station is provided. The base station comprises a transmitter configured to transmit downlink control information for coordinated multipoint (CoMP) joint transmission to a subscriber station. The transmitting base station is the only base station transmitting downlink control information for CoMP joint transmission to the subscriber station.

For use in a wireless communications network, a base station capable is provided. The base station comprises a transmitter configured to transmit a first indication of an active set of cells to a subscriber station, and a receiver configured to receive information related to the active set of cells from the subscriber station. The transmitter is further configured to transmit a second indication of a subset of the active set to the subscriber station through the physical downlink control channel (PDCCH), the subset of the active cells being determined by the anchor cell. The receiver is further configured to receive information channel related information for the subset of the active cells from the subscriber station.

A method of operating a network is provided. The method comprises selecting by an anchor cell a subset of cells from an active set of cells, and transmitting by the anchor cell an indication of the subset of cells to a subscriber station. The method also comprises transmitting by the subscriber station channel-related information for the subset of cells to the anchor cell, and selecting by the anchor cell one or more cells from the subset of cells to participate in a coordinated multipoint (CoMP) joint transmission based at least partly upon the channel-related information. The method further comprises communicating by the anchor cell the cell_ID of the anchor cell to the one or more cells that have been selected to participate in the CoMP joint transmission, and determining by each of the one or more selected cells a cell-specific frequency shift based on the anchor cell cell_ID for one or more dedicated antenna ports.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 10 illustrates a PDCCH format containing a field to indicate a threshold value according to an embodiment of this disclosure;

FIG. 11 is a table illustrating the use of 2-bit values to indicate a differential CQI value according to an embodiment of this disclosure;

FIG. 12 illustrates a PDCCH format containing a flag to indicate which cells or eNBs within the active set will be participating in the CoMP joint transmission according to an embodiment of this disclosure;

FIG. 13 illustrates an example of a bitmap used by a network to indicate which cells or eNBs within the active set will be transmitting to the UE during the CoMP joint transmission according to an embodiment of this disclosure;

FIG. 14 illustrates an example of a bitmap used by a network to indicate which cells or eNBs within the active set will be transmitting to the UE during the CoMP joint transmission according to an embodiment of this disclosure;

FIG. 15 is a table illustrating the use of 2-bit values to indicate the cells or eNBs within the active set that will be transmitting during the CoMP joint transmission according to an embodiment of this disclosure;

FIG. 16 illustrates an operation of computing a phase shift according to an embodiment of this disclosure;

FIG. 17 illustrates a table of phase shift indexes and the corresponding shift values according to an embodiment of this disclosure;

FIG. 18 illustrates CQI reporting using an M selected sub-bands CQI and a wideband CQI according to an embodiment of this disclosure;

FIGS. 19A to 19C illustrate phase shift feedbacks for the same precoding matrix indicator (PMI) configuration across an active set of cells or eNBs according to an embodiment of this disclosure;

DETAILED DESCRIPTION OF THE INVENTION

FIGS. 1 through 26, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communications system.

With regard to the following description, it is understood that the Long Term Evolution (LTE) term "enhanced node B" or "eNB" is another term for "base station" used below. Although this disclosure uses the term "eNB" in association with the term "cell", the term "cell", as used in this disclosure, represents a logic concept that includes any type of transmission unit having a cell_ID in a wireless system. For example, a cell may be a sector or a relay as well as a base station. Further, the LTE term "user equipment" or "UE" is another term for "subscriber station" used below.

Figure 1:
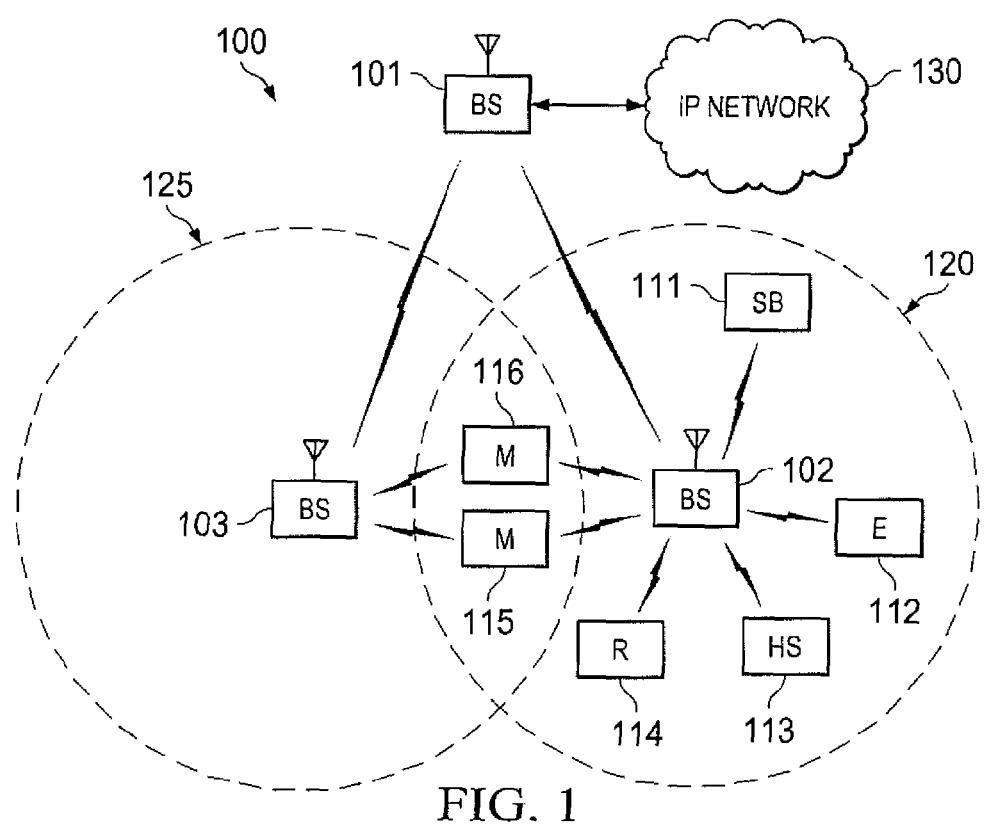
FIG. 1 illustrates an exemplary wireless network according to one embodiment of this disclosure.

FIG. 1 illustrates an exemplary wireless network 100 according to one embodiment of this disclosure. In the illustrated embodiment, wireless network 100 includes a base station (BS) 101, a base station (BS) 102, and a base station (BS) 103. BS 101 communicates with BS 102 and BS 103. BS 101 also communicates with an Internet protocol (IP) network 130, such as the Internet, a proprietary IP network, or other data network.

BS 102 provides wireless broadband access to network 130, via BS 101, to a first plurality of subscriber stations within a coverage area 120 of BS 102. The first plurality of subscriber stations includes a subscriber station (SS) 111, a subscriber station (SS) 112, a subscriber station (SS) 113, a subscriber station (SS) 114, a subscriber station (SS) 115 and a subscriber station (SS) 116. A subscriber station (SS) may be any wireless communication device such as, but not limited to, a mobile phone, mobile PDA and any mobile station (MS). In an exemplary embodiment, SS 111 may be located in a small business (SB), SS 112 may be located in an enterprise (E), SS 113 may be located in a WiFi hotspot (HS), SS 114 may be located in a residence, SS 115 may be a mobile (M) device, and SS 116 may be a mobile (M) device.

BS 103 provides wireless broadband access to network 130, via BS 101, to a second plurality of subscriber stations within a coverage area 125 of BS 103. The second plurality of subscriber stations includes SS 115 and SS 116. In alternate embodiments, BSs 102 and 103 may be connected directly to the Internet or other controller unit by means of a wired broadband connection, such as an optical fiber, DSL, cable or T1/E1 line, rather than indirectly through BS 101.

In other embodiments, BS 101 may be in communication with either fewer or more base stations. Furthermore, while only six subscriber stations are shown in FIG. 1, it is understood that wireless network 100 may provide wireless broadband access to more than six subscriber stations. It is noted that SS 115 and SS 116 are on the edge of both coverage area 120 and coverage area 125. SS 115 and SS 116 each communicate with both BS 102 and BS 103 and may be said to be cell-edge devices interfering with each other. For example, the communications between BS 102 and SS 116 may be interfering with the communications between BS 103 and SS 115. Additionally, the communications between BS 103 and SS 115 may be interfering with the communications between BS 102 and SS 116.

In an exemplary embodiment, BSs 101-103 may communicate with each other and with SSs 111-116 using an IEEE-802.16 wireless metropolitan area network standard such as, for example, an IEEE-802.16e standard. In another embodiment, however, a different wireless protocol may be employed such as, for example, a HIPERMAN wireless metropolitan area network standard. BS 101 may communicate through direct line-of-sight or non-line-of-sight with BS 102 and BS 103 depending on the technology used for the wireless backhaul. BS 102 and BS 103 may each communicate through non-line-of-sight with SSs 111-116 using orthogonal frequency-division multiplexing (OFDM) and/or orthogonal frequency-division multiple access (OFDMA) techniques.

BS 102 may provide a T1 level service to SS 112 associated with the enterprise and a fractional T1 level service to SS 111 associated with the small business. BS 102 may provide wireless backhaul for SS 113 associated with the WiFi hotspot that may be located in an airport, café, hotel, or college campus. BS 102 may provide digital subscriber line (DSL) level service to SSs 114, 115 and 116.

SSs 111-116 may use the broadband access to network 130 to access voice, data, video, video teleconferencing, and/or other broadband services. In an exemplary embodiment, one or more of SSs 111-116 may be associated with an access point (AP) of a WiFi WLAN. SS 116 may be any of a number of mobile devices including a wireless-enabled laptop computer, personal data assistant, notebook, handheld device, or other wireless-enabled device. SS 114 may be, for example, a wireless-enabled personal computer, a laptop computer, a gateway, or another device.

Dotted lines show the approximate extents of coverage areas 120 and 125, which are shown as approximately circular for the purposes of illustration and explanation only. It should be clearly understood that the coverage areas associated with base stations (for example, coverage areas 120 and 125) may have other shapes, including irregular shapes, depending upon the configuration of the base stations and variations in the radio environment associated with natural and man-made obstructions.

Also, the coverage areas associated with base stations are not constant over time and may be dynamic (expanding, contracting or changing shape) based on changing transmission power levels of the base station and/or the subscriber stations, weather conditions, and other factors. In an embodiment, the radius of the coverage areas of the base stations (for example, coverage areas 120 and 125 of BSs 102 and 103) may extend in the range from less than 2 kilometers to about fifty kilometers from the base stations.

As is well known in the art, a base station, such as BS 101, 102, or 103, may employ directional antennas to support a plurality of sectors within the coverage area. In FIG. 1, BSs 102 and 103 are depicted approximately in the center of coverage areas 120 and 125, respectively. In other embodiments, the use of directional antennas may locate the base station near the edge of the coverage area (for example, at the point of a cone-shaped or pear-shaped coverage area).

The connection to network 130 from BS 101 may comprise a broadband connection (for example, a fiber optic line) to servers located in a central office or another operating company point-of-presence. The servers may provide communication to an Internet gateway for Internet protocol-based communications and to a public switched telephone network gateway for voice-based communications. In the case of voice-based communications in the form of voice-over-IP (VoIP), the traffic may be forwarded directly to the Internet gateway instead of the public switched telephone network (PSTN) gateway. The servers, Internet gateway, and PSTN gateway are not shown in FIG. 1. In another embodiment, the connection to network 130 may be provided by different network nodes and equipment.

In accordance with an embodiment of this disclosure, one or more of BSs 101-103 and/or one or more of SSs 111-116 comprises a receiver that is operable to decode a plurality of data streams received as a combined data stream from a plurality of transmit antennas using a minimum mean square error successive interference cancellation (MMSE-SIC) algorithm. As described in more detail below, the receiver is operable to determine a decoding order for the data streams based on a decoding prediction metric for each data stream that is calculated based on a strength-related characteristic of the data stream. Thus, in general, the receiver is able to decode the strongest data stream first, followed by the next strongest data stream, and so on. As a result, the decoding performance of the receiver is improved as compared to a receiver that decodes streams in a random or pre-determined order without being as complex as a receiver that searches all possible decoding orders to find the optimum order.

Figure 2:
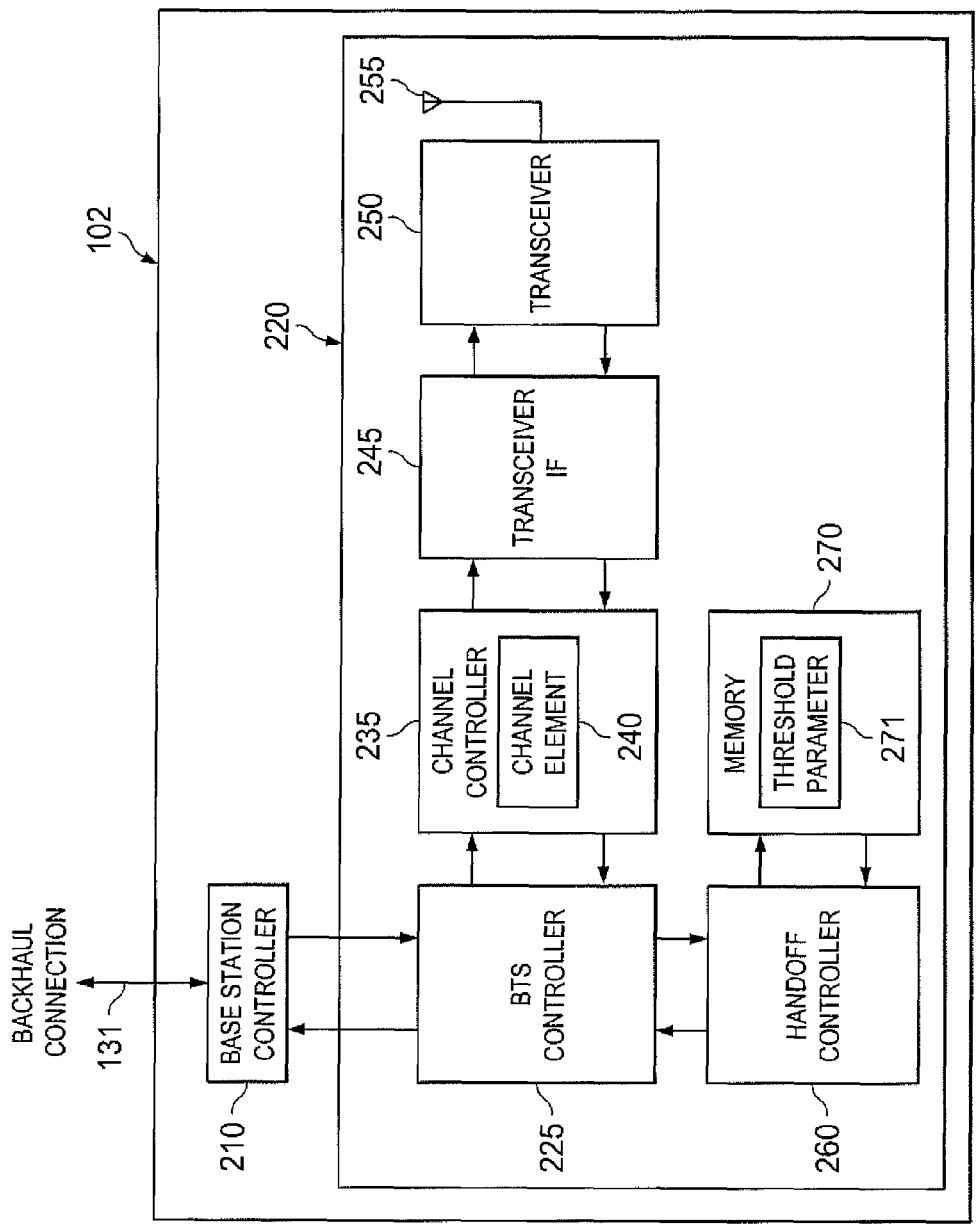
FIG. 2 illustrates an exemplary base station in greater detail according to one embodiment of this disclosure.

FIG. 2 illustrates an exemplary base station in greater detail according to one embodiment of this disclosure. The embodiment of base station (BS) 102 illustrated in FIG. 2 is for illustration only. Other embodiments of the BS 102 could be used without departing from the scope of this disclosure.

BS 102 comprises a base station controller (BSC) 210 and a base transceiver subsystem (BTS) 220. A base station controller is a device that manages wireless communications resources, including base transceiver subsystems, for specified cells within a wireless communications network. A base transceiver subsystem comprises the RF transceivers, antennas, and other electrical equipment located in each cell site. This equipment may include air conditioning units, heating units, electrical supplies, telephone line interfaces, RF transmitters and RF receivers. For the purpose of simplicity and clarity in explaining the operation of this disclosure, the base transceiver subsystem and the base station controller associated with each base transceiver subsystem are collectively represented by BS 101, BS 102 and BS 103, respectively.

BSC 210 manages the resources in a cell site including BTS 220. BTS 220 comprises a BTS controller 225, a channel controller 235, a transceiver interface (IF) 245, an RF transceiver unit 250, and an antenna array 255. Channel controller 235 comprises a plurality of channel elements including an exemplary channel element 240. BTS 220 also comprises a handoff controller 260 and a memory 270. The embodiment of handoff controller 260 and memory 270 included within BTS 220 is for illustration only. Handoff controller 260 and memory 270 can be located in other portions of BS 102 without departing from the scope of this disclosure.

BTS controller 225 comprises processing circuitry and memory capable of executing an operating program that communicates with BSC 210 and controls the overall operation of BTS 220. Under normal conditions, BTS controller 225 directs the operation of channel controller 235, which contains a number of channel elements including channel element 240 that perform bi-directional communications in the forward channels and the reverse channels. A forward channel refers to a channel in which signals are transmitted from the base station to the mobile station (also referred to as DOWNLINK communications). A reverse channel refers to a channel in which signals are transmitted from the mobile station to the base station (also referred to as UPLINK communications). In an embodiment of this disclosure, the channel elements communicate according to an OFDMA protocol with the mobile stations in cell 120. Transceiver IF 245 transfers the bi-directional channel signals between channel controller 240 and RF transceiver unit 250. The embodiment of RF transceiver unit 250 as a single device is for illustration only. RF transceiver unit 250 can comprise separate transmitter and receiver devices without departing from the scope of this disclosure.

Antenna array 255 transmits forward channel signals received from RF transceiver unit 250 to mobile stations in the coverage area of BS 102. Antenna array 255 also sends to transceiver 250 reverse channel signals received from mobile stations in the coverage area of BS 102. In some embodiments of this disclosure, antenna array 255 is a multi-sector antenna, such as a three-sector antenna in which each antenna sector is responsible for transmitting and receiving in a 120° arc of coverage area. Additionally, RF transceiver 250 may contain an antenna selection unit to select among different antennas in antenna array 255 during transmit and receive operations.

According to some embodiments of this disclosure, BTS controller 225 is configured to store a preconfigured threshold parameter 271 in memory 270. The preconfigured threshold parameter 271 is used by BS 102 to determine if a subscriber station is at a cell edge and would benefit from coordinated multipoint (CoMP) joint transmission. Memory 270 can be any computer readable medium. For example, the memory 270 can be any electronic, magnetic, electromagnetic, optical, electro-optical, electro-mechanical, and/or other physical device that can contain, store, communicate, propagate, or transmit a computer program, software, firmware, or data for use by the microprocessor or other computer-related system or method. A part of memory 270 comprises a random access memory (RAM), and another part of memory 270 comprises a Flash memory that acts as a read-only memory (ROM).

BSC 210 is configured to maintain communications with BS 101, BS 102 and BS 103. BS 102 communicates with BS 101 and BS 103 via a wireless connection. In some embodiments, the wireless connection is a wire-line connection.

Figure 3:
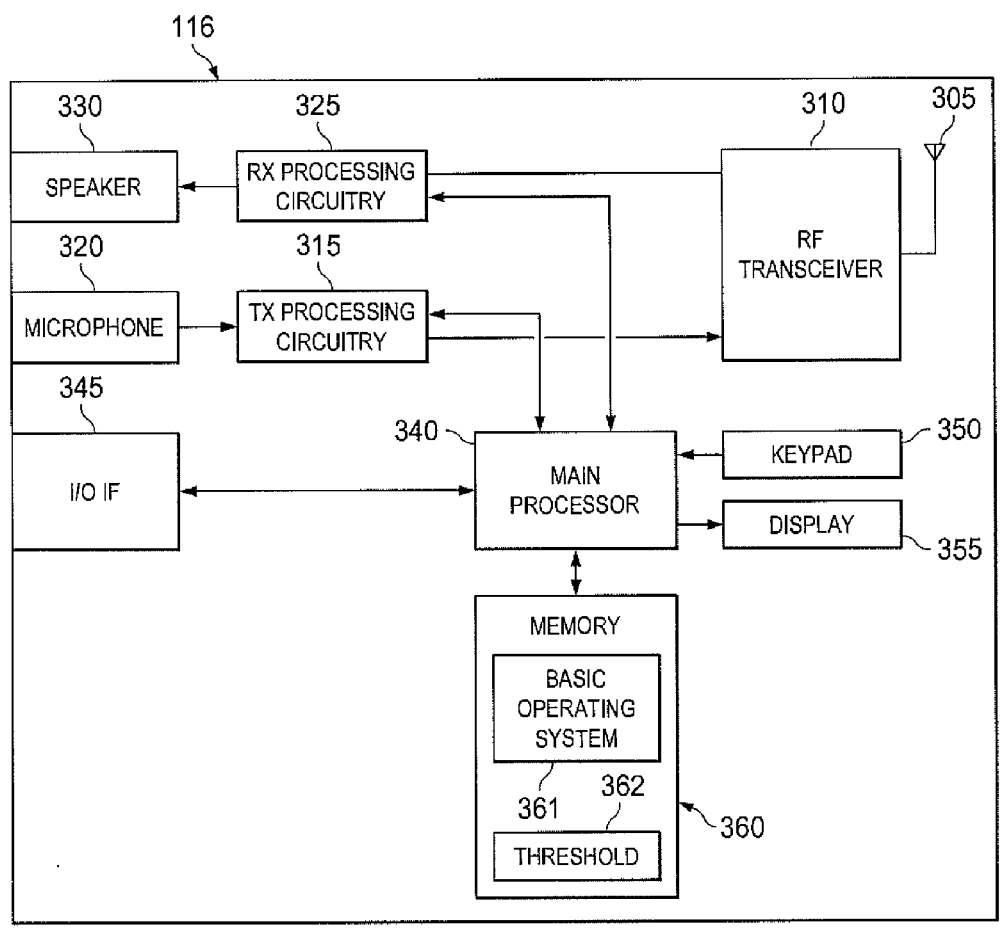
FIG. 3 illustrates an exemplary wireless subscriber station in greater detail according to embodiments of this disclosure.

FIG. 3 illustrates an exemplary wireless subscriber station in greater detail according to embodiments of this disclosure. The embodiment of wireless subscriber station (SS) 116 illustrated in FIG. 3 is for illustration only. Other embodiments of the wireless SS 116 could be used without departing from the scope of this disclosure.

Wireless SS 116 comprises an antenna 305, a radio frequency (RF) transceiver 310, a transmit (TX) processing circuitry 315, a microphone 320, and a receive (RX) processing circuitry 325. SS 116 also comprises a speaker 330, a main processor 340, an input/output (I/O) interface (IF) 345, a keypad 350, a display 355, and a memory 360. Memory 360 further comprises a basic operating system (OS) program 361 and a preconfigured threshold parameter 362 used to determine if SS 116 is at a cell edge and would benefit from coordinated multipoint (CoMP) joint transmission.

Radio frequency (RF) transceiver 310 receives from antenna 305 an incoming RF signal transmitted by a base station of wireless network 100. Radio frequency (RF) transceiver 310 down-converts the incoming RF signal to produce an intermediate frequency (IF) or a baseband signal. The IF or baseband signal is sent to receiver (RX) processing circuitry 325 that produces a processed baseband signal by filtering, decoding, and/or digitizing the baseband or IF signal. Receiver (RX) processing circuitry 325 transmits the processed baseband signal to speaker 330 (i.e., voice data) or main processor 340 for further processing (e.g., web browsing).

Transmitter (TX) processing circuitry 315 receives analog or digital voice data from microphone 320 or other outgoing baseband data (e.g., web data, e-mail, interactive video game data) from main processor 340. Transmitter (TX) processing circuitry 315 encodes, multiplexes, and/or digitizes the outgoing baseband data to produce a processed baseband or IF signal. Radio frequency (RF) transceiver 310 receives the outgoing processed baseband or IF signal from transmitter (TX) processing circuitry 315. Radio frequency (RF) transceiver 310 up-converts the baseband or IF signal to a radio frequency (RF) signal that is transmitted via antenna 305.

In some embodiments of this disclosure, main processor 340 is a microprocessor or microcontroller. Memory 360 is coupled to main processor 340. According to some embodiments of this disclosure, a part of memory 360 comprises a random access memory (RAM) and another part of memory 360 comprises a Flash memory that acts as a read-only memory (ROM).

Main processor 340 executes a basic operating system (OS) program 361 stored in memory 360 in order to control the overall operation of wireless SS 116. In one such operation, main processor 340 controls the reception of forward channel signals and the transmission of reverse channel signals by radio frequency (RF) transceiver 310, receiver (RX) processing circuitry 325, and transmitter (TX) processing circuitry 315 in accordance with well-known principles.

Main processor 340 is capable of executing other processes and programs resident in memory 360. Main processor 340 can move data into or out of memory 360 as required by an executing process. In some embodiments, the main processor 340 is configured to vary the preconfigured threshold parameter 362. The main processor 340 can vary the threshold based on OS program 361 or in response to a signal received from BS 102. Main processor 340 also is coupled to I/O interface 345. I/O interface 345 provides SS 116 with the ability to connect to other devices such as laptop computers and handheld computers. I/O interface 345 is the communication path between these accessories and main controller 340.

Main processor 340 also is coupled to keypad 350 and display unit 355. The operator of SS 116 uses keypad 350 to enter data into SS 116. Display 355 may be a liquid crystal display (LCD) capable of rendering text and/or at least limited graphics from web sites. Alternate embodiments may use other types of displays.

Embodiments of this disclosure provide coordinated multipoint (CoMP) joint processing from multiple cells. CoMP joint processing from multiple cells not only minimizes interference but also turns interference into useful signals. CoMP joint processing is particularly useful for cell-edge users where the interference is relatively strong compared to the received signal.

Figure 4:
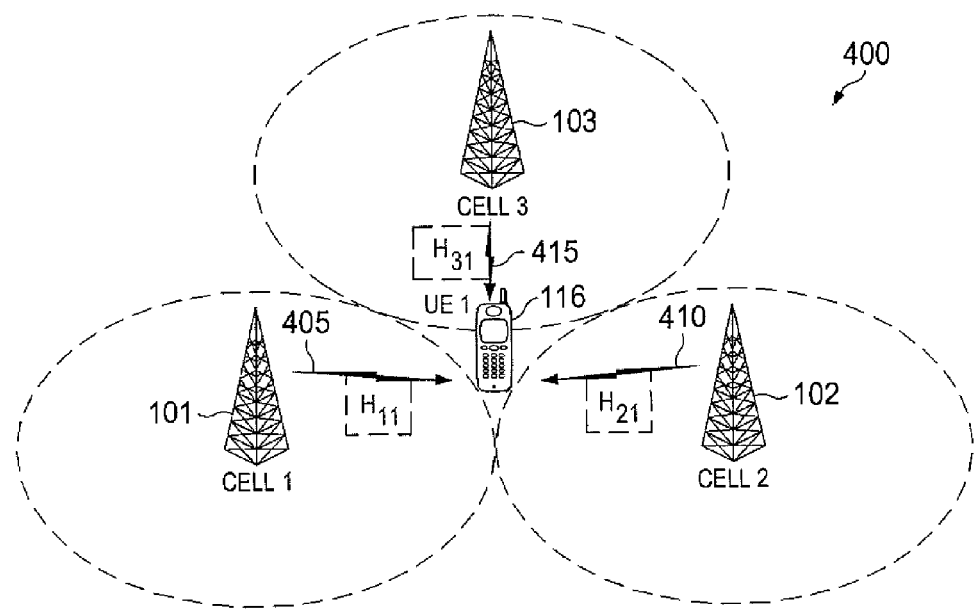
FIG. 4 illustrates a CoMP joint transmission according to an embodiment of this disclosure.

FIG. 4 illustrates a CoMP joint transmission 400 according to an embodiment of this disclosure. The embodiment of the CoMP joint transmission 400 shown in FIG. 4 is for illustration only. Other embodiments of the CoMP joint transmission could be used without departing from the scope of this disclosure.

In single point transmission, each user equipment or UE, such as SS 116, receives a transmission from one cell or enhanced node B (eNB), such as BS 102. In the CoMP joint transmission 400, SS 116 receives the same data from more than one cell, such as from BS 101, BS 102 and BS 103

In FIG. 4, BS 102 (i.e., "Cell 2") is the actual serving cell for SS 116. BS 103 (i.e., "Cell 3") and BS 101 (i.e., "Cell 1") are strong interference cells with regard to SS 116. $H_{i1}$ corresponds to the wireless channel from "Cell i" to SS 116. Accordingly, $H_{11}$ 405 corresponds to the wireless channel from BS 101 to SS 116; $H_{21}$ 410 corresponds to the wireless channel from BS 102 to SS 116; and $H_{31}$ 415 corresponds to the wireless channel from BS 103 to SS 116. When in the joint processing mode, BS 101, BS 102 and BS 103 jointly process SS 116's information together. BS 101, BS 102 and BS 103 simultaneously send SS 116's information over the air to SS 116 through the wireless channels. By coordinating the joint transmission of the information, the interference at SS 116 is greatly reduced while the received power (the sum of the power from the three cells BS 101, BS 102 and BS 103) is greatly improved.

In an embodiment of this disclosure, the downlink control information for the CoMP joint transmission is transmitted by the anchor cell. That is, the UE expects to receive or listens for control information only from the anchor cell. The anchor cell refers to the serving cell during the cell search procedure, and in some embodiments, the anchor cell participates in the CoMP joint transmission as a default. In the case where the physical downlink control channel (PDCCH) is transmitted from all the cells or eNBs within the active set, the physical control format information channel (PCFICH) of the different cells should be the same size and the PDCCH should be sent across all the configured actual transmitting cells or eNBs.

In some embodiments of this disclosure, the serving cell semi-statically determines if the UE will participate in the CoMP joint transmission. If the serving cell determines that the UE will participate in the CoMP joint transmission, the serving cell also determines the associated serving cells or eNBs (i.e., the active set of cells) based on the UE's feedback in the physical uplink control channel (PUCCH). The serving cell or eNB would then indicate the CoMP cooperation through a new physical downlink control channel (PDCCH) format. In this new PDCCH format, several bit fields contain the cell_IDs for an active set of cells that the UE needs to monitor the received signal strength. In some embodiments, the number of bit fields indicating the cell_IDs is configured by the network.

Figure 5:
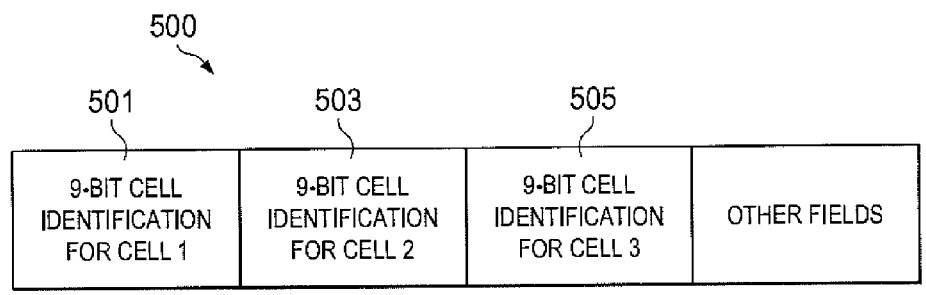
FIG. 5 illustrates a physical downlink control channel (PD-CCH) format containing a plurality of bit fields to indicate the cell_IDs of an active set of cells according to an embodiment of this disclosure.

FIG. 5 illustrates a PDCCH format 500 according to an embodiment of this disclosure. The embodiment of the PDCCH format 500 illustrated in FIG. 5 is for illustration only. Other embodiments of the PDCCH format 500 could be used without departing from the scope of this disclosure.

In this embodiment, PDCCH format 500 contains three bit fields indicating three cell_IDs that form the active set of cells. A bit field 501 contains a 9-bit cell_ID for Cell 1. A bit field 503 contains a 9-bit cell_ID for Cell 2, and a bit field 505 contains a 9-bit cell_ID for Cell 3.

With new PDCCH format 500, the serving cell or eNB explicitly informs the UE of the cell_IDs of the possible cooperating cells or eNBs. In this case, possible serving cells of the UE are Cell 0 (current serving cell), Cell 1, Cell 2, and Cell 3. In other words, the active set of cooperating cells is Cell 0, Cell 1, Cell 2, and Cell 3. The UE then monitors the received signal strength from the cells or eNBs indicated in the PDCCH format 500.

Figure 6:
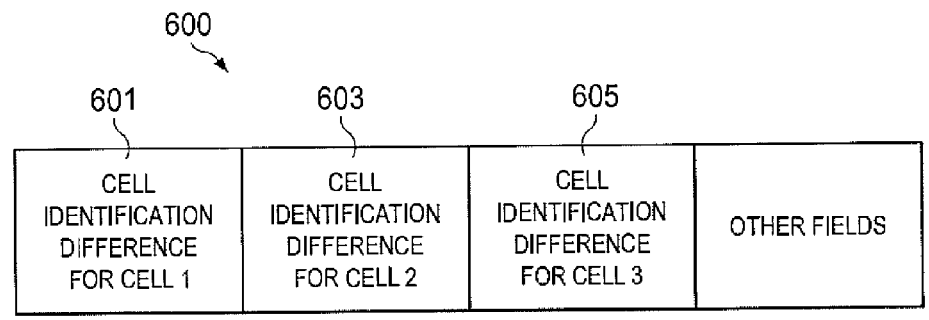
FIG. 6 illustrates a PDCCH format containing a plurality of bit fields to indicate the difference between the cell_IDs of an active cell and that of the current serving cell according to an embodiment of this disclosure.

FIG. 6 illustrates a PDCCH format 600 according to an embodiment of this disclosure. The embodiment of the PDCCH format 600 illustrated in FIG. 6 is for illustration only. Other embodiments of the PDCCH format 600 could be used without departing from the scope of this disclosure.

In this embodiment, the PDCCH format 600 contains three bit fields indicating the difference between the cell_ID of an active cell and that of the current serving cell. A bit field 601 contains a 9-bit cell_ID difference for Cell 1. A bit field 603 contains a 9-bit cell_ID difference for Cell 2, and a bit field 605 contains a 9-bit cell_ID difference for Cell 3.

In one embodiment, the cell_ID difference for Cell i is based on the difference between the cell_ID of Cell i and that of Cell 0 (or the current serving cell).

In another embodiment, the cell_ID difference for Cell i is based on the physical layer identity. In such an embodiment, the cell_ID difference can be determined, for example, as shown in Equation 1 below:

$$N_{ID}^{cell} = 3 N_{ID}^{(1)} + N_{ID}^{(2)},$$ [Eqn. 1]

where $N_{ID}^{(1)}$ is the physical-layer cell-identity groups and $N_{ID}^{(2)}$ is the identity of Cell i within the group.

In a further embodiment, the cell_ID difference for Cell i is based on the difference between the physical-layer cell-identity groups and the difference between identities within the group of the Cell i and Cell 0 (or the serving cell).

Figure 7:
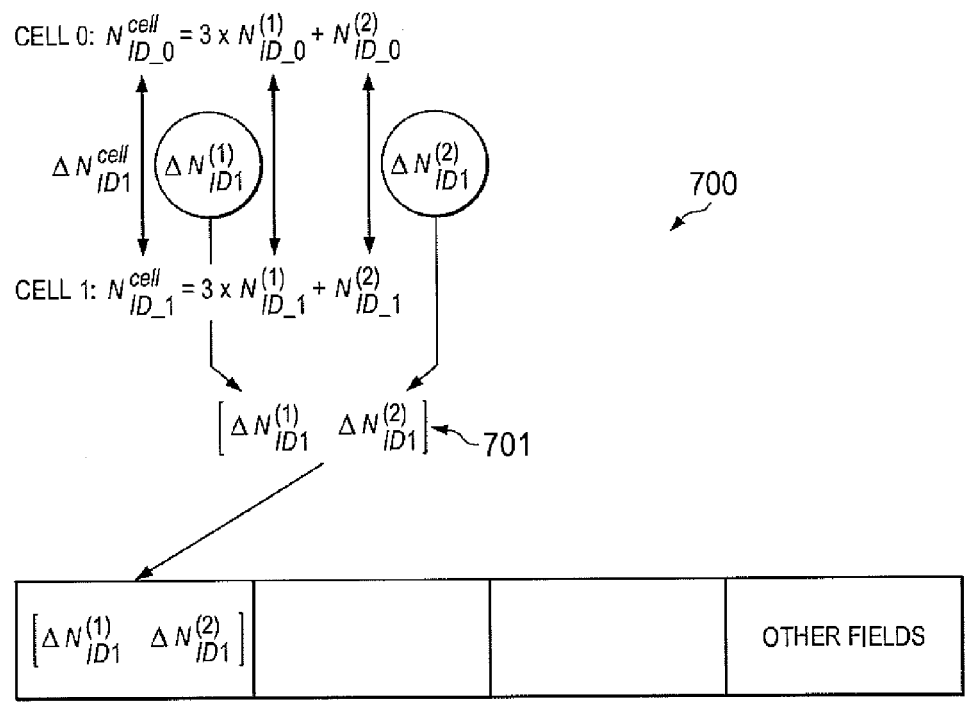
FIG. 7 illustrates a method of computing a difference between two cells or eNBS according to an embodiment of this disclosure.

FIG. 7 illustrates a method 700 of computing a difference between two cells or eNBS according to an embodiment of this disclosure. The embodiment of the method 700 illustrated in FIG. 7 is for illustration only. Other embodiments of the method 700 could be used without departing from the scope of this disclosure.

As shown in FIG. 7, a computed difference 701 between Cell 0 and Cell 1 would be the cell_ID difference placed in the bit field 601 for Cell 1.

Once the UE receives the new PDCCH format 500 or 600, the UE monitors the received signal strength from the active set of cells or eNBs indicated in the PDCCH format 500 or 600. The UE feeds back the received signal strength or other channel strength measurement for the active set of cells or eNBs during CQI reporting. In one embodiment, the UE provides the channel strength or CQI of each cell or eNB in the active set using a new CQI report format in the PUCCH.

Figure 8:
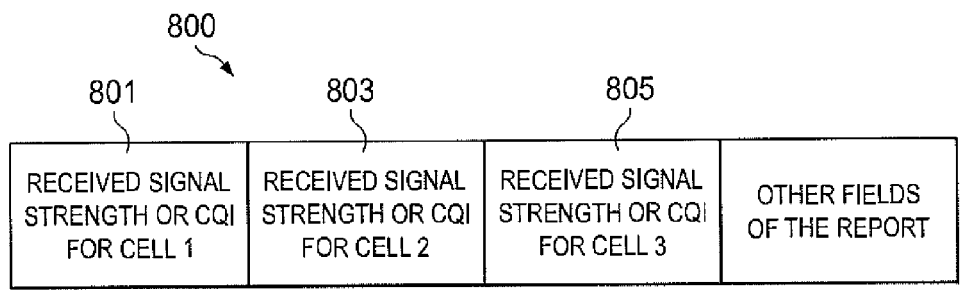
FIG. 8 illustrates a physical uplink control channel (PUCCH) format containing a plurality of bit fields to indicate the received signal strength or CQI for an active set of cells according to an embodiment of this disclosure.

FIG. 8 illustrates a physical uplink control channel (PUCCH) format 800 according to an embodiment of this disclosure. The embodiment of the PUCCH format 800 illustrated in FIG. 8 is for illustration only. Other embodiments of the PUCCH format 800 could be used without departing from the scope of this disclosure.

Multiple bit fields are created in the new PUCCH format 800. The bit fields correspond to the different cells or eNBs in the active set of cells. In this embodiment, Cell 0 is the current serving cell (or anchor cell) while Cell 1, Cell 2 and Cell 3 are possible cooperating cells specified in the PDCCH format 500 or 600. An anchor cell is defined as the serving cell during the cell search procedure and participates in the CoMP joint transmission by default. Three bit fields are created in the new uplink control information (UCI) format with each field corresponding to a cooperating cell specified in the PDCCH format 500 or 600. In some embodiments, the current serving cell will always be transmitting in CoMP joint transmission. In the embodiment shown in FIG. 8, a bit field 801 is used to indicate the received signal strength or CQI for Cell 1. A bit field 803 is used to indicate the received signal strength or CQI for Cell 2, and a bit field 805 is used to indicate the received signal strength or CQI for Cell 3. The received signal strength field of cell i can be the CQI, received signal strength, ratio of the received signal strength compared to current serving cell (anchor cell), or the differential CQI as opposed to the anchor cell.

In another embodiment, a bitmap is used by the UE to indicate the preference of the cells specified in the PDCCH format 500 or 600. The ordering of the cells in the active set can be in decreasing order or increasing order of the cell_IDs with each bit in the bitmap field corresponding to one cell. In one example, when an active cell is preferred by a UE for CoMP joint transmission, the UE places a first bitmap value, such as "1", in the bit field corresponding to that active cell. Furthermore, when an active cell is not preferred by a UE for CoMP joint transmission, the UE places a second bitmap value, such as "0", in the bit field corresponding to that active cell.

Figure 9:
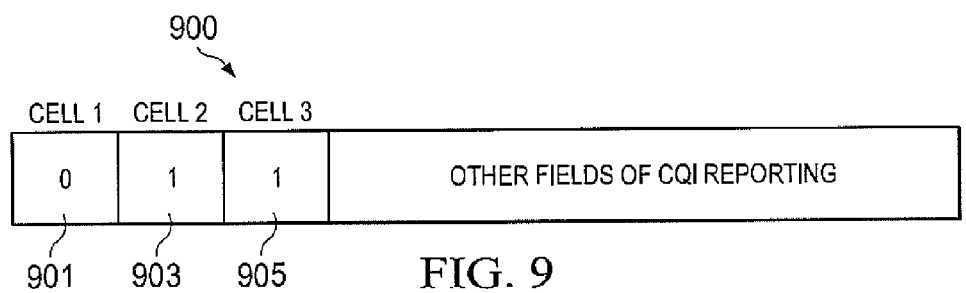
FIG. 9 illustrates an example of a bitmap used by a UE for indicating the preference of cells according to an embodiment of this disclosure.

FIG. 9 illustrates an example of a bitmap 900 used by a UE for indicating the preference of cells according to an embodiment of this disclosure. The embodiment of the bitmap 900 illustrated in FIG. 9 is for illustration only. Other embodiments of the bitmap 900 could be used without departing from the scope of this disclosure.

In the embodiment shown in FIG. 9, it is assumed that $N_{ID1}^{cell} < N_{ID2}^{cell} < N_{ID3}^{cell}$. In this embodiment, the bitmap 900 lists cells in increasing order of the cell_IDs. The UE in this case has placed a bitmap of "0" in a bit field 901 corresponding to Cell 1. The UE also has placed a bitmap of "1" in a bit field 903 corresponding to Cell 2 and a bitmap of "1" in a bit field 905 corresponding to Cell 3. As such, the UE is reporting that Cell 2 and Cell 3 are the preferred set of cells or eNBs with which to perform CoMP joint transmission. Since there are altogether four cells (i.e., Cell 0, Cell 1, Cell 2, and Cell 3) in the pre-determined active set, the bitmap 900 can be used to indicate 8 possible transmission modes with the bitmap [0 0 0] indicating a fallback mode of single cell operation with the serving cell.

In some embodiments, the determination of the preference on each cell or eNB is based on a pre-determined value or threshold (such as the threshold parameter 271 or the threshold parameter 362) that is semi-statically configured by the network or the UE. For example, the pre-determined threshold or the value could depend on the received signal strength (CQI) or the ratio between the received signal strength of that cell as opposed to the anchor cell (i.e., differential CQI). As the performance measures at the UE (such as received signal strength, CQI, or relative received signal strength of CQI) pass the threshold, the UE sets the bit field of the bitmap corresponding to that cell to be "1". In some embodiments, this threshold or value can be semi-statically configured by the UE or can be signaled to the UE through higher layer signaling from the cells or eNBs. In other embodiments, the threshold or value can be configured semi-statically from the higher layer signaling or can be dynamically configured by the cells or eNBs through a new filed in a PDCCH format.

FIG. 10 illustrates a PDCCH format 1000 according to an embodiment of this disclosure. The embodiment of the PDCCH format 1000 illustrated in FIG. 10 is for illustration only. Other embodiments of the PDCCH format 1000 could be used without departing from the scope of this disclosure.

As shown in FIG. 10, the PDCCH format 1000 comprises a 2 or 3-bit field 1001 indicating a threshold value (such as the threshold parameter 271 or the threshold parameter 362). In some embodiments, the threshold value is used to indicate the differential CQI value between the active set of cells and the anchor cell. Several bits can be used to indicate the differential CQI value.

FIG. 11 is a table 1100 illustrating the use of 2-bit values to indicate a differential CQI value according to an embodiment of this disclosure. The embodiment of the table 1100 illustrated in FIG. 11 is for illustration only. Other embodiments of the table 1100 could be used without departing from the scope of this disclosure.

In this embodiment, a 2-bit value of [0 0] as shown in a line 1101 indicates a differential CQI value of −1. A line 1103 shows that a 2-bit value of [0 1] indicates a differential CQI value of −2. A line 1105 shows that a 2-bit value of [1 0] indicates a differential CQI value of −3, and a line 1107 shows that a 2-bit value of [1 1] indicates a differential CQI value of −4.

The feedback information provided by the UE (for example, the PUCCH format 800 and the bitmap 900) is then used at the cells or eNBs to decide the actual transmitting or serving set of cells or eNBs in the CoMP joint transmission.

In one embodiment, the network configures the active set of cells or eNBs for the targeted UEs. The cell_IDs of the cells or eNBs within the active set are provided to UE. Upon receiving information about the active set, the UE would have two different operation modes based on a flag in a PDCCH field.

FIG. 12 illustrates a PDCCH format 1200 according to an embodiment of this disclosure. The embodiment of the PDCCH format 1200 illustrated in FIG. 12 is for illustration only. Other embodiments of the PDCCH format 1200 could be used without departing from the scope of this disclosure.

In this embodiment, the PDCCH format 1200 contains a flag 1201 indicating which cells or eNBs within the active set will be participating in the CoMP joint transmission. If the flag 1201 is a first value (for example, a "0"), then only a subset of the cells or eNBs within the active set will be transmitting. If the flag 1201 is a second value (for example, a "1"), then all of the cells or eNBs within the active set will be transmitting. For example, if Cell 0, Cell 1, and Cell 2 are the cells or eNBs within the active set, then a flag 1201 value of "1" indicates that Cell 0, Cell 1, and Cell 2 will be the transmitting cells.

In another embodiment, the network uses a bitmap to indicate which cells or eNBs within the active set will be transmitting to the UE during the CoMP joint transmission.

FIG. 13 illustrates an example of a bitmap 1300 used by a network to indicate which cells or eNBs within the active set will be transmitting to the UE during the CoMP joint transmission according to an embodiment of this disclosure. The embodiment of the bitmap 1300 illustrated in FIG. 13 is for illustration only. Other embodiments of the bitmap 1300 could be used without departing from the scope of this disclosure.

The bitmap indicating the actual transmitting cells can be in increasing or decreasing order by the cell_IDs. For each bitmap, a first value (such as a "1") can be used to indicate that the corresponding cell or eNB is transmitting, and a second value (such as a "0") can be used to indicate that the corresponding cell or eNB is not transmitting. In the example shown in FIG. 13, a value of "1" in a bit field 1301 indicates that Cell 0 is a transmitting cell. A value of "0" in a bit field 1303 indicates that Cell 1 is not a transmitting cell, and a value of "1" in a bit field 1305 indicates that Cell 1 is a transmitting cell.

In one embodiment, all the cells or eNBs within the active will be indicated by the bitmap 1300. In another embodiment, the bitmap 1300 only indicates the cells or eNBs other than the anchor cell within the active set. In such an embodiment, the anchor cell is understood by the UE to be participating in the CoMP joint transmission. Therefore, if Cell 0 is the anchor cell, then only a 2-bit bitmap is needed to indicate the actual transmitting cells or eNBs.

FIG. 14 illustrates an example of a bitmap 1400 used by a network to indicate which cells or eNBs within the active set will be transmitting to the UE during the CoMP joint transmission according to an embodiment of this disclosure. The embodiment of the bitmap 1400 illustrated in FIG. 14 is for illustration only. Other embodiments of the bitmap 1400 could be used without departing from the scope of this disclosure.

As with the bitmap 1300, the mapping of the bitmap 1400 can be in the increasing order of the cell_ID or in the decreasing order of the cell_ID configured by higher layer signaling. In this embodiment, a value of "1" in a bit field 1401 indicates that Cell 1 is a transmitting cell, and a value of "0" in a bit field 1403 indicates that Cell 2 is not a transmitting cell. Cell 0 or the anchor cell is understood by the UE to be participating in the CoMP joint transmission. Therefore, a bit field for the anchor cell is not necessary in such an embodiment.

FIG. 15 is a table 1500 illustrating the use of 2-bit values to indicate the cells or eNBs within the active set that will be transmitting during the CoMP joint transmission according to an embodiment of this disclosure. The embodiment of the table 1500 illustrated in FIG. 15 is for illustration only. Other embodiments of the table 1500 could be used without departing from the scope of this disclosure.

In this embodiment, a 2-bit value of [0 0] as shown in a line 1501 indicates that only Cell 0, the anchor cell, will be transmitting. A line 1503 shows that a 2-bit value of [0 1] indicates that Cell 0 and Cell 2 will be transmitting. A line 1505 shows that a 2-bit value of [1 0] indicates that Cell 0 and Cell 1 will be transmitting, and a line 1507 shows that a 2-bit value of [1 1] indicates that Cell 0, Cell 1, and Cell 2 will be transmitting.

In some embodiments, the phase shift indication (PSI) is fed back among the serving cells or eNBS. The PSI mainly characterizes the phase shift between the PMIs from different cells or eNBs in the active set to make the precoded data from each cell align with each other. The phase shift of each cell is computed as opposed to the anchor cell or a predetermined reference cell. In one example, there are K cells in the active set, such as Cell 0 through Cell K−1. Cell 0 is the anchor cell or the reference cell with $\overline{H_{01}}$ being the estimated channel matrix for Cell 0 at the UE, and Cell i is other cell within the active set with $\overline{H_{i1}}$ being the estimated channel matrix for Cell i at the UE.

FIG. 16 illustrates an operation 1600 of computing a phase shift according to an embodiment of this disclosure. The embodiment of the operation 1600 illustrated in FIG. 16 is for illustration only. Other embodiments of the operation 1600 could be used without departing from the scope of this disclosure.

In FIG. 16, a phase shift computation block 1601 is used by the UE to compute the phase shifts for each cell. For example, the phase shift computation block 1601 can be expressed as shown in Equation 2 below:

$$\max_{\theta_1,\ldots,\theta_K} \|w_0\overline{H_{01}} + e^{j\theta_1} \cdot w_1\overline{H_{11}} + \ldots + e^{j\theta_K} \cdot w_K\overline{H_{K1}}\|. \quad [\text{Eqn. 2}]$$

The resulting $\theta_i$ is the phase shift for cell i within the active set other than the anchor cell. Information related to these phase shifts is then reported to the anchor serving cell or the network through the PUCCH. In some embodiments, the reporting of the phase shift information includes joint quantizing the phase shifts $[\theta_1, \ldots, \theta_{K-1}]$ based on the number of bits available for the feedback of the phase shift information. In further embodiments, the K−1 dimensional space is uniformly quantized based on the number of bits available to feedback the phase shift. For example, a codebook can be constructed of the phase shift information where each phase shift indication value corresponds to an index of a codebook vector. For the case with N bits and K cells or eNBs in the active set, the codebook of the phase shift information can be constructed in the following manner. When K=2, the vector l in the codebook has the form of $[1 \ e^{j\theta_l}]$, where $$\theta_l = \frac{2\pi \times l}{2^N}, l = 0, \ldots 2^N - 1.$$

FIG. 17 illustrates a table 1700 of phase shift indexes and the corresponding shift values according to an embodiment of this disclosure. The embodiment of the table 1700 illustrated in FIG. 17 is for illustration only. Other embodiments of the table 1700 could be used without departing from the scope of this disclosure.

The table 1700 illustrates a case in which K=2 and N=2. A phase shift index of 0 in the codebook as shown in a line 1701 indicates a shift value of 0 or 0° for $\theta_1$. A line 1703 shows that a phase shift index of 1 in the codebook indicates a shift value of $\pi/2$ or 90° for $\theta_1$. A line 1705 shows that a phase shift index of 2 in the codebook indicates a shift value of $\pi$ or 180° for $\theta_i$, and a line 1707 shows that a phase shift index of 3 in the codebook indicates a shift value of $3\pi/2$ or 270° for $\theta_1$.

In some embodiments, the multiple cells or eNBs choose the corresponding PMIs for their downlink transmission to the UE based at least partly upon the PMI and phase shift indication report of the UE. In this embodiment, the anchor cell or the reference cell informs the UE of the PMIs and the phase shifts that will be used in the downlink CoMP joint transmission in a new bit field of a DCI format. The CoMP joint transmission can be either transmitted through common antenna ports or through the dedicated antenna ports.

For CoMP joint transmission, the precoding vector for data as well as the reference signals (RSs) can be constructed as follows. The precoder takes as input a block of vectors $x(i) = [x^{(0)}(i) \ldots X^{(\upsilon-1)}(i)]^T$ from the layer mapping and generates a block of vectors $y_j(i) = [\ldots y_j^{(P)}(i), \ldots]^T$, i=0, 1, ..., $M_{symb}^{ap} - 1$, j=1, ..., K where K is the number of serving cells or eNBs in CoMP joint transmission to be mapped onto resources on each of the antenna ports, where $y_j^{(p)}(i)$ represents the signal for antenna port p of cell or eNB j. The block of data generated under CoMP joint transmission can be illustrated, for example, as shown in Equation 3 below:

$$\begin{bmatrix} y_1^{(0)}(i) \\ \vdots \\ y_1^{(P-1)}(i) \\ \vdots \\ y_K^{(0)}(i) \\ \vdots \\ y_K^{(P-1)}(i) \end{bmatrix} = D(i)[W_1(i), \ldots, W_K(i)] \begin{bmatrix} x^{(0)}(i) \\ \vdots \\ x^{(\upsilon-1)}(i) \end{bmatrix}, \quad [\text{Eqn. 3}]$$

where the precoding matrix $W_j(i)$ is of size P×υ and i=0, 1, ..., $M_{symb}^{ap} - 1$, $M_{symb}^{ap} = M_{symb}^{layer}$. K is the number of serving cells or eNBs participating in the CoMP joint transmission. The diagonal size-KP×KP matrix D(i) is generated from the phase shift information which is in a form, for example, as shown Equation 4 below:

$$D(i) = \begin{bmatrix} 1 & & & & & & \\ & \ddots & & & & & \\ & & 1 & & & & \\ & & & e^{j\theta_1} & & & \\ & & & & \ddots & & \\ & & & & & e^{j\theta_1} & \\ & & & & & & \ddots \\ & & & & & & & e^{j\theta_K} \\ & & & & & & & & \ddots \\ & & & & & & & & & e^{j\theta_K} \end{bmatrix}, \quad [\text{Eqn. 4}]$$

$$D(i) = \begin{bmatrix} I_P & & & \\ & e^{j\theta_1} I_P & & \\ & & \ddots & \\ & & & e^{j\theta_K} I_P \end{bmatrix},$$

where $I_p$ is the identity matrix of size P and $e^{j\theta_j}$ is the jth element of the phase shift precoder vector.

In some embodiments, the UE generates the CQI feedback information assuming that all the serving cells or eNBs use the feedback PMI together with the associated phase shift. In computing the CQI feedback, the received signals from the serving cells or eNBs (i.e., cells or eNBs within the active set) are treated as useful signals while other signals are treated as interference. The received signals from each cell or eNB within the active set is assumed to be precoded using the PMI and the associated phase shift.

For example, for the case there are two serving cells or eNBs, the PMI feedback for Cell 1 and Cell 2 are $w_1$ and $w_2$, respectively. The associated quantized phase shift is $\theta_1$ as opposed to the reference cell or anchor cell. In such a case, the overall CQI report could be computed, for example, based on Equation 5 below:

$$SINR = \frac{\|H_{11}w_1 + e^{j\theta_1} \cdot H_{21}w_2\|^2}{I + N_1}, \quad [\text{Eqn. 5}]$$

where I denotes the interference from the cells or eNBs outside the active set and $N_1$ denotes the thermal noise.

This CQI feedback can be either subband or wideband depending on the system configuration. For example, in one embodiment, the UE selects a set of M preferred subbands and the overall CQI report can be based on this M subbands assuming that the PMIS together with the phase shifts are used at the cells or eNBs. In another embodiment, the overall CQI can be based on the whole band. The overall CQI or the CoMP CQI report can be either of these two kinds or a combination of both.

FIG. 18 illustrates CQI reporting using an M selected subbands CQI and a wideband CQI according to an embodiment of this disclosure.

As shown in FIG. 18, Cell 0 has subbands 1 to 4, and Cell 1 has subbands 1 to 4 as the allocated bandwidth. In this case, the UE can base the overall CQI report on M selected subbands 1801. Alternatively or additionally, the UE can base the overall CQI report on the entire allocated bandwidth 1803.

In one embodiment of this disclosure, the same PMI feedback configuration, which is semi-statically configured by higher layer signaling, is performed for all the serving cells or eNBs (i.e., all the cells or eNBs within the active set).

In such an embodiment, the UE feedbacks the PMIs for the cells or eNBs within the active set using the same PMI feedback mode: single PMI feedback or multiple PMIS feedback across the entire active set. When feeding back multiple PMIS across the entire active set, the same set S subbands should be applied to all the cells or eNBs within the active set. The phase shift indication follows the same numerology used for the PMI reporting. That is, for each PMI feedback across all the serving cells or eNBs, one phase shift indication should be associated with each PMI feedback.

If the PMI feedback is based on assuming transmission on set S subbands, then a phase shift indication should be associated with the single PMI feedback for each cell or eNB within the active set.

If the PMI feedback is based on selecting a PMI for each set S subband, then the phase shift indication also should be associated with each set S subband.

If the PMI feedback is based on selecting PMI preferred for the M selected subbands, then the phase shift indication also should be associated with the M selected subbands.

Figure 19B:
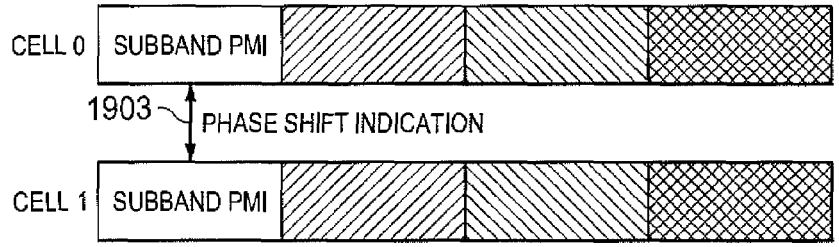
Figure 19C:
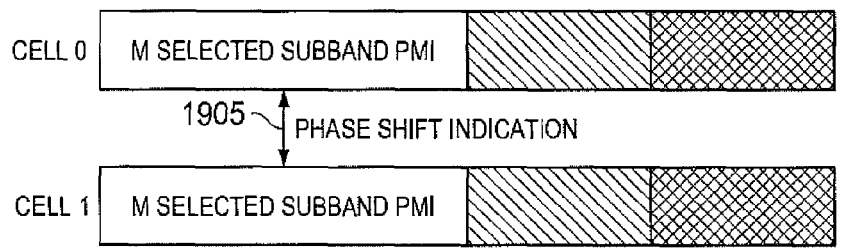

FIGS. 19A to 19C illustrate phase shift feedbacks for the same PMI configuration across an active set cells or eNBs according to an embodiment of this disclosure.

FIG. 19A shows an embodiment in which the PMI feedback is based on a wideband PMI. In this embodiment, a phase shift indication 1901 is associated with the entire allocated bandwidth.

FIG. 19B shows an embodiment in which the PMI feedback is based on an S subband PMI. In this embodiment, a phase shift indication 1903 is associated with the S subband.

FIG. 19C shows an embodiment in which the PMI feedback is based on an M selected subbands PMI. In this embodiment, a phase shift indication 1905 is associated with the M selected subbands.

In another embodiment of this disclosure, different PMI feedback configurations, which are semi-statically configured by higher layer signaling, are performed for the serving cells or eNBs (i.e., all the cells or eNBs within the active set). The phase shift indication feedback follows the same numerology as any of the PMI feedback configurations.

For example, for the case where there are two serving cells or eNBs (i.e., two cells or eNBs in the active set), the PMI feedback for one cell can be based on a wideband report, and the PMI feedback for the other cell can be based on an S subband report. In such a case, the phase shift indication feedback can be either wideband or subband. When the phase shift indication is based on an S subband, the numerology for selecting the configuration of the subband follows that of the PMI feedback. For example, the UE reports the selected single precoding matrix preferred for the M selected subbands together with the associated phase shift indication.

Figure 20A:
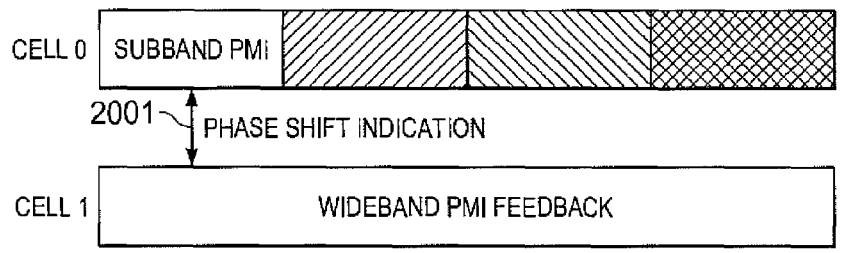
FIGS. 20A and 20B illustrate phase shift feedbacks for different PMI configurations across an active set cells or eNBs according to an embodiment of this disclosure.
Figure 20B:
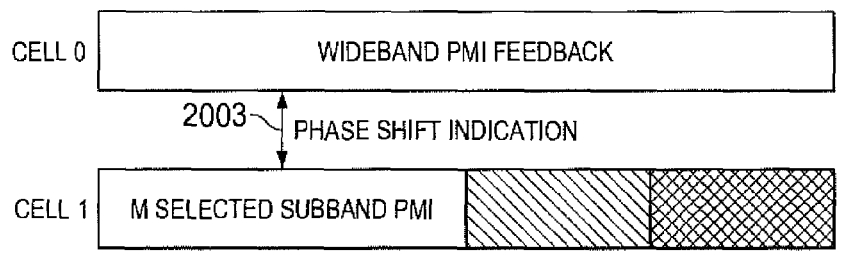

FIGS. 20A and 20B illustrate phase shift feedbacks for different PMI configurations across an active set cells or eNBs according to an embodiment of this disclosure.

FIG. 20A shows an embodiment in which the PMI feedback for Cell 0 is based on an S subband, and the PMI feedback for Cell 1 is based on a wideband PMI. In this embodiment, a phase shift indication 2001 can be associated with either the S subband of Cell 0 or the entire allocated bandwidth of Cell 1.

FIG. 20B shows an embodiment in which the PMI feedback for Cell 0 is based on a wideband PMI, and the PMI feedback for Cell 1 is based on an M selected subbands. In this embodiment, a phase shift indication 2003 can be associated with either the entire allocated bandwidth of Cell 0 or the M selected subbands of Cell 1.

In one embodiment of this disclosure, the PMI feedback is performed based on a standard codebook. In some embodiments, the UE feeds back the PMI for each serving cell or eNB (i.e., each cell or eNB within the active set) using either wideband or subband reporting.

For example, for the case where there are K serving cells or eNBs in the active set, the UE selects the precoding vectors for each serving cell or eNB from a standard codebook and cascades the precoding vectors into a big precoding matrix as shown in Equation 6 below:

$$[W_1, \ldots, W_K], \quad [\text{Eqn. 6}]$$

where $W_i$ is the precoding vector or matrix for cell or eNB i.

The UE selects the joint precoding matrix that maximizes the SNR or other performance measures and feedbacks the corresponding indicator of $W_i$ to cell or eNB i. For the case in which Cell 0 and Cell 1 are the transmitting cells in the active set, in some embodiments, the UE determines the joint precoding matrix that maximizes the SNR or other performance measures, for example, using Equation 7 below:

$$\max_{w_0 \in \Omega_0, w_1 \in \Omega_1} (w_0 \overline{H_{01}} + w_1 \overline{H_{11}}), \quad [\text{Eqn. 7}]$$

where $\Omega_i$ is the LTE codebook for the PMIs of Cell i.

This feedback mechanism can be based on either wideband or subband reporting. That is, the UE reports the preferred PMIs for the M selected subbands or reports the selected single PMI for all set S subbands.

In another embodiment, an indication of the reference antennas based on the PMI feedback using a standard codebook is also provided. In some embodiments, the UE feedbacks the PMIs for each serving cell or eNB (i.e., each cell or eNB within the active set) together with an indication of the reference antenna for each serving cell or eNB. The indicator of the reference antenna indicates which antenna port of a serving cell or eNB (i.e., one cell or eNB of the active set) serves as the reference antenna port within that cell or eNB.

For example, for the case where there are two serving cells or eNBs (i.e., two cells or eNBs in the active set) and each cell or eNB has four transmit antennas, the UE can report the PMI for each cell or eNB. An indication of the reference antenna of Cell 2 can be incorporated. For example, for Cell 2, an indication of the reference antenna can be 0 to 3. In one embodiment, if the indication is i, the reference antenna of Cell 2 becomes antenna port i. Accordingly, an example of a precoding matrix that maximizes the SNR or other performance measures is shown in Equation 8 below:

$$[W_{11}, \ldots, W_{14}, W_{2i+1}, \ldots, W_{24}, W_{21}, \ldots W_{2i}] \quad [\text{Eqn. 8}]$$

where $W_{ij}$ is the jth element of precoding matrix $W_i$.

In another embodiment of this disclosure, different PMI feedbacks are utilized for different serving cells or eNBs (i.e., different cells or eNBs within the active set). In specific embodiments, the differential PMI feedback for cell or eNB i is the offset between PMI for cell or eNB i and the PMI for a particular reference cell or eNB. This particular reference cell or eNB can be the anchor cell or eNB or any predetermined cell or eNB. The PMI feedback and the reference cell or eNB can be semi-statically configured by the network through higher layer signaling.

For example, if Cell 1 is the anchor cell or eNB, the PMI value for the Cell i offset level can be computed using Equation 8 below:

PMI value for cell i offset level=PMI value for anchor cell−PMI value for cell i. [Eqn. 8]

This differential PMI value can be used for both subband PMI reporting and wideband PMI reporting.

In one embodiment of this disclosure, once the UE receives an indication of the cells or eNBs that will be transmitting, the CoMP joint transmission is enabled through dedicated antenna ports using the same cell-specific frequency shift in the dedicated reference signal pattern. In one embodiment of the CoMP joint transmission using dedicate antenna ports, the same frequency shift is applied across all the transmitting cells or eNBs. The frequency shift is based on the anchor cell_ID or a reference cell_ID. In some embodiments, the cell_ID of the anchor cell or the reference cell is communicated to all the transmitting cells or eNBs through higher layer signaling.

When performing CoMP joint dedicated beam-forming for the UE, the transmitting cells or eNBs can use, for example, Equation 10 below to determine the cell-specific frequency shift:

$$v_{shift} = N_{ID}^{AnchorCell} \mod 3, \quad [\text{Eqn. 10}]$$

where $N_{ID}^{AnchorCell}$ is the anchor cell_ID or the reference cell_ID. In other words, the UE expects the cell-specific frequency shift to follow the cell_ID of the anchor cell or reference cell.

Figure 21:
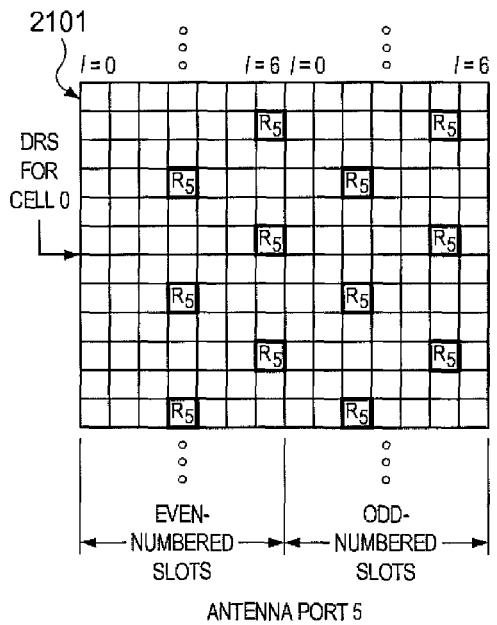
FIG. 21 illustrates the alignment of dedicated reference signals within the same active set of cells or eNBs according to an embodiment of this disclosure.
Figure 21:
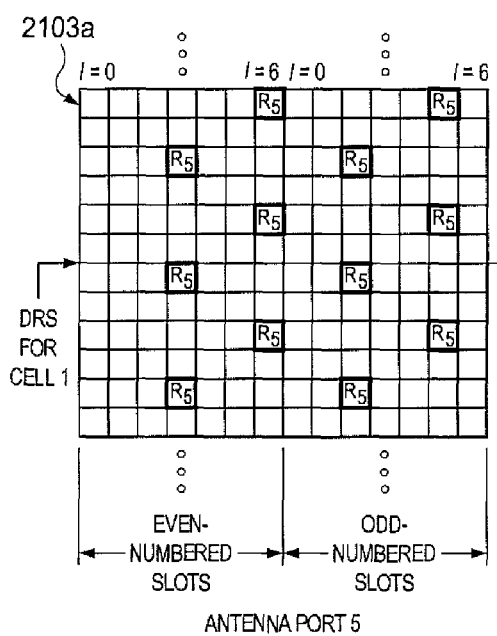
Figure 21:
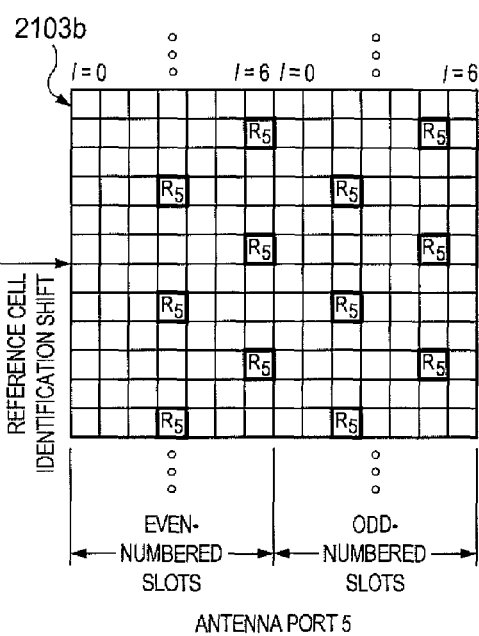

FIG. 21 illustrates the alignment of dedicated reference signals within the same active set of cells or eNBs according to an embodiment of this disclosure.

FIG. 21 shows a resource block 2101 of Cell 0 having a dedicated reference signal pattern. FIG. 21 also shows a resource block 2103a of Cell 1 having a dedicated reference signal pattern that is not in alignment with the dedicated reference signal pattern of Cell 0. In this embodiment, the Cell 0 is the anchor cell or the reference cell, and the cell_ID of Cell 0 is 3 while the cell_ID of Cell 1 is 4. The cell-specific frequency shift for using the dedicated beam forming across both cells is based on the cell_ID of Cell 0. Therefore, the dedicated reference signal pattern of Cell 1 is frequency shifted as shown in a resource block 2103b so that the resource elements of Cell 1 align with the resource elements of Cell 0. In this way, the resource elements of the dedicated reference signals will be aligned with one another within the same active set.

Figure 22:
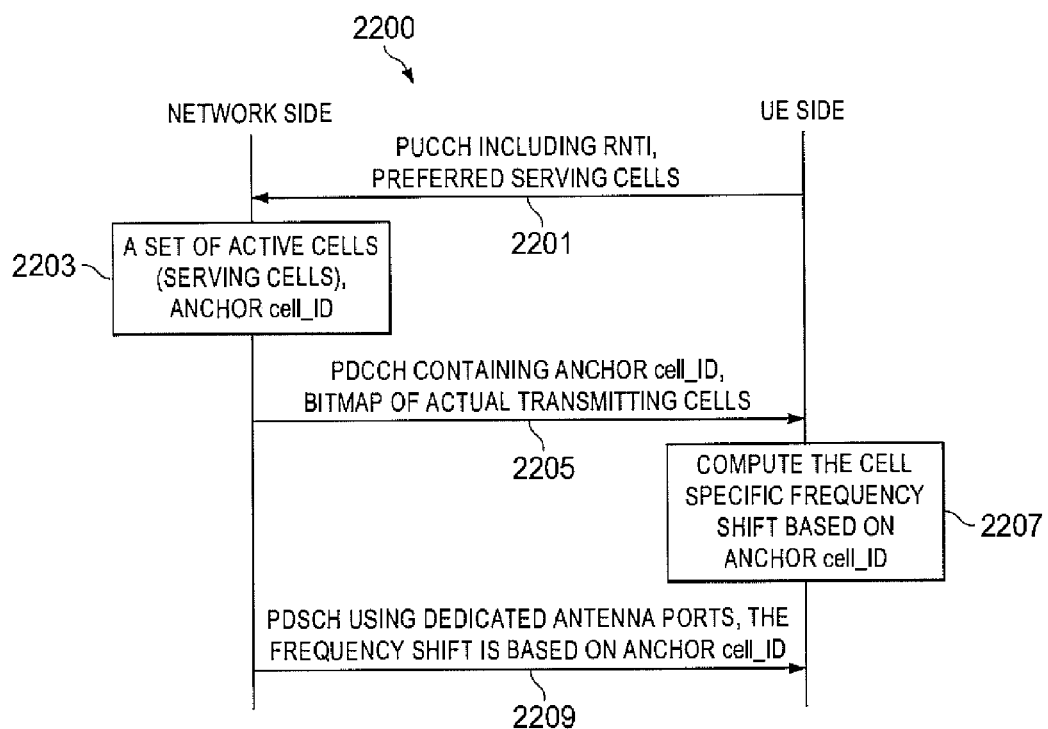
FIG. 22 illustrates a flow diagram for CoMP joint transmission using dedicated antenna ports according to an embodiment of this disclosure.

FIG. 22 illustrates a flow diagram 2200 for CoMP joint transmission using dedicated antenna ports according to an embodiment of this disclosure. The embodiment of the flow diagram 2200 illustrated in FIG. 22 is for illustration only. Other embodiments of the timeline 2200 could be used without departing from the scope of this disclosure.

As shown in FIG. 22, a UE transmits a radio network temporary identifier (RNRI) along with an indication of the preferred serving cells or eNBs using the PUCCH to a network at flow 2201. At flow 2203, the network determines the actual transmitting cells or eNBs from the indication of the preferred serving cells or eNBs. The network also determines the cell_ID of the anchor cell at flow 2203. At flow 2205, the network transmits the cell_ID of the anchor cell or eNB along with a bitmap of the actual transmitting cells or eNBs. The UE computes the cell-specific frequency shift based on the cell_ID of the anchor cell or eNB at flow 2207. The network then transmits data for the UE on the physical downlink shared channel (PDSCH) using dedicated antenna ports and applying frequency shift based on the cell_ID of the anchor cell or eNB at flow 2209.

In another embodiment of this disclosure, the CoMP joint transmission is extended to use dedicated antenna ports beyond rank 1. In one such embodiment, the rank of the dedicated beam-forming of CoMP joint transmission is signaled to the targeted UE through the anchor cell or eNB (or any other cell or eNB within the active set).

Figure 23:
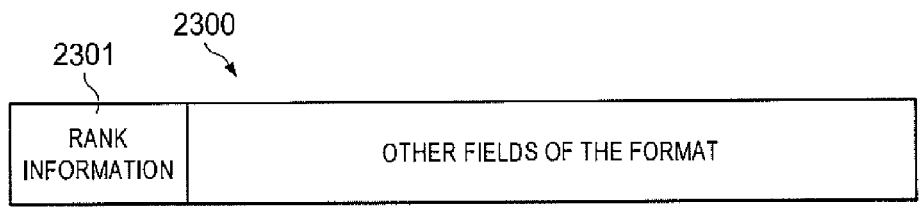
FIG. 23 illustrates a PDCCH format containing a field indicating the rank of the dedicated beam-forming according to an embodiment of this disclosure.

FIG. 23 illustrates a PDCCH format 2300 according to an embodiment of this disclosure. The embodiment of the PDCCH format 2300 illustrated in FIG. 23 is for illustration only. Other embodiments of the PDCCH format 2300 could be used without departing from the scope of this disclosure.

In this embodiment, the PDCCH format 2300 contains a field 2301 indicating the rank of the dedicated beam-forming. In a particular embodiment, when the rank of the dedicated beam-forming is more than 1, the UE expects the cell-specific frequency shift of the dedicated reference signals to be based on both the anchor cell_ID (or the reference cell cell_ID) and the layer number of the CoMP joint dedicated beam forming.

For example, the cell-specific frequency shift of the UE-specific reference signal for layer i of the CoMP joint dedicated beamforming can be given, for example, by Equation 11 below:

$$v_{shift} = (N_{ID}^{AnchorCell} + i - 1) \bmod 3 \qquad [\text{Eqn. 11}]$$

where $N_{ID}^{AnchorCell}$ is the cell_ID of the anchor cell or the reference cell, $v_{shift}$ is the cell-specific frequency shift, and i is the layer number of rank of the dedicated beam-forming for the CoMP joint transmission. In this particular embodiment, the rank of the dedicated beam-forming for CoMP joint transmission cannot be more than 3. That is, $1 \leq i \leq 3$.

Figure 24:
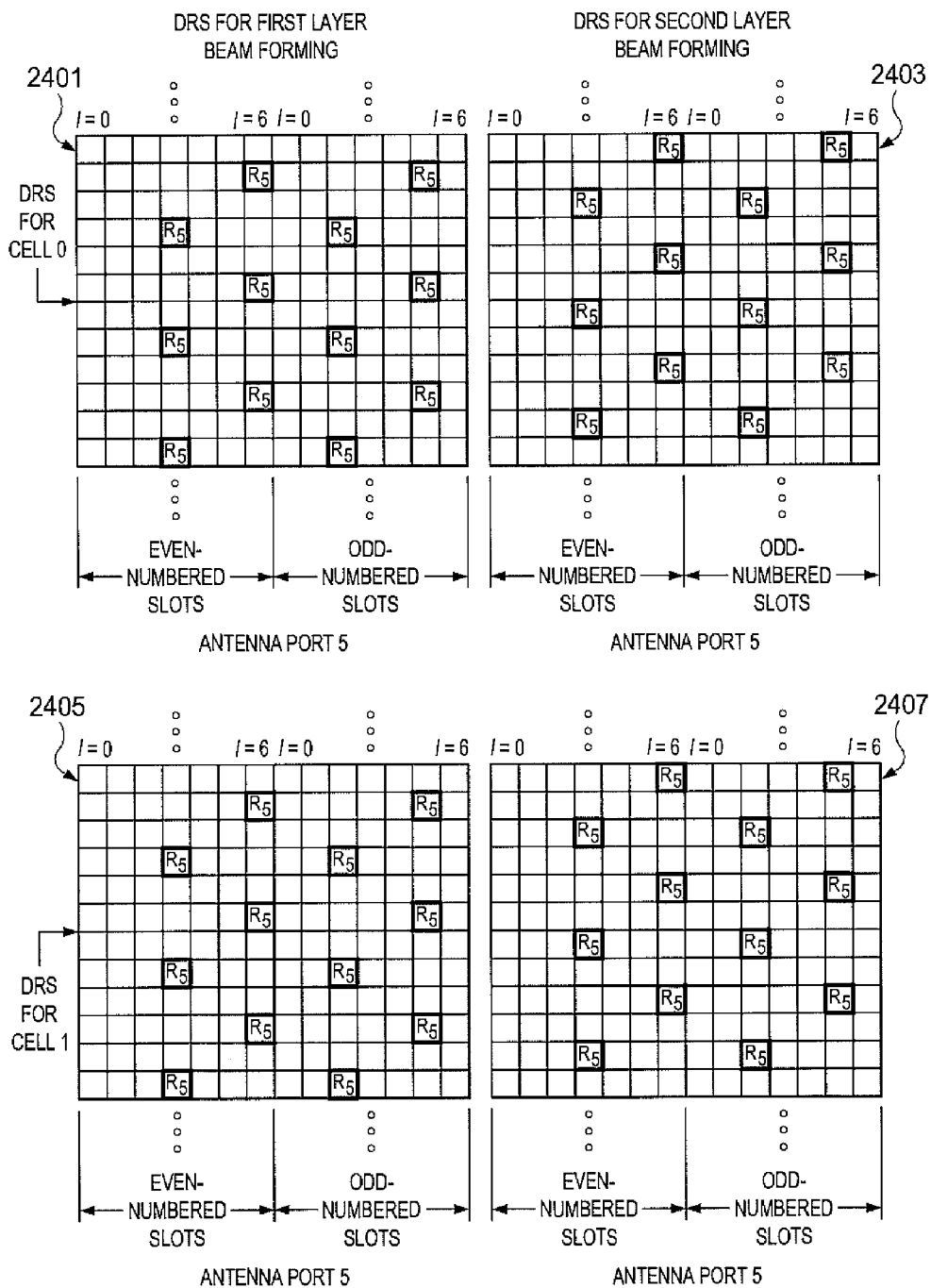
FIG. 24 illustrates a dedicated reference signal pattern for a case where the active set contains two cells according to an embodiment of this disclosure.

FIG. 24 illustrates a dedicated reference signal pattern for a case where the active set contains two cells according to an embodiment of this disclosure.

FIG. 24 shows a resource block 2401 of Cell 0 having a dedicated reference signal pattern for first layer beamforming. FIG. 24 also shows a resource block 2403 of Cell 0 having a dedicated reference signal pattern for second layer beamforming. A resource block 2405 of Cell 1 having a dedicated reference signal pattern for first layer beamforming and a resource block 2407 of Cell 1 having a dedicated reference signal pattern for second layer beamforming also are shown. In this example, Cell 0 is the anchor or reference cell of the transmitting set. The cell_ID of Cell 0 is 3k where k is any integer.

Figures 25, 26:
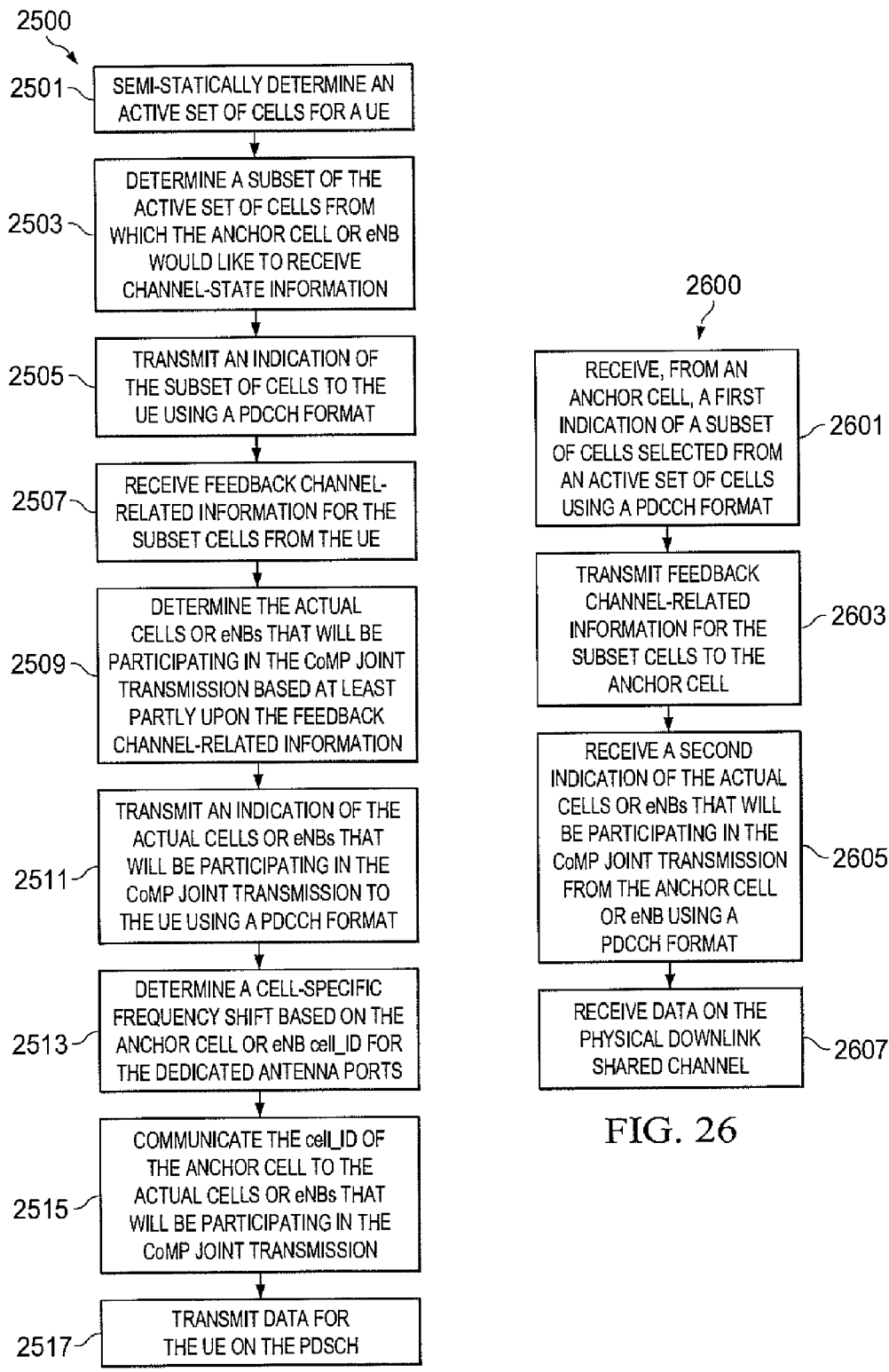
FIG. 25 illustrates a method of operating an anchor cell, eNB, or base station according to an embodiment of this disclosure.
FIG. 26 illustrates a method of operating a UE or subscriber station according to an embodiment of this disclosure.

FIG. 25 illustrates a method 2500 of operating an anchor cell, eNB, or base station according to an embodiment of this disclosure. The embodiment of the method 2500 illustrated in FIG. 25 is for illustration only. Other embodiments of the method 2500 could be used without departing from the scope of this disclosure.

As shown in FIG. 25, if the UE is to participate in CoMP joint transmission, the anchor cell or eNB semi-statically determines one or more cells comprising an active set of cell for the UE (block 2501). The anchor cell or eNB then determines a subset of the active set of cells from which the anchor cell or eNB would like to receive channel-state information (block 2503). In one particular embodiment, the anchor cell or eNB determines the subset using received signal strength from the UE. Optionally, in other embodiments, the anchor cell or eNB also receives an indication of the preferred serving cells or eNBs from the UE. The anchor cell or eNB then transmits an indication of the subset of cells or eNBs to the UE using PDCCH (block 2505). The anchor cell or eNB then receives feedback channel-related information for the subset cells from the UE (block 2507). In some embodiments, the feedback channel-related information includes inter-channel information between the subset of cells. In particular embodiments, the inter-channel information can include phase-shift information. In some embodiments, the feedback channel-related information is provided to the anchor cell or eNB in a plurality of bit fields in a PUCCH format. Upon receiving the feedback channel-related information, the anchor cell or eNB then determines the actual cells or eNBs that will be participating in the CoMP joint transmission based at least partly upon the feedback channel-related information (block 2509). The anchor cell or eNB then transmits an indication of the actual cells or eNBs that will be participating in the CoMP joint transmission to the UE using a PDCCH format (block 2511). In some embodiments, the actual cells or eNBs that will be participating in the CoMP joint transmission are indicated using a bitmap. The anchor cell or eNB then determines a cell-specific frequency shift based on the anchor cell or eNB cell_ID for the dedicated antenna ports (block 2513). The anchor cell or eNB communicates its cell_ID to the actual cells or eNBs that will be participating in the CoMP joint transmission (block 2515). The cell_ID of the anchor cell or eNB is used by the actual transmitting cells or eNBs to calculate the cell-specific frequency shift at each of the actual transmitting cells or eNBs for the dedicated antenna ports. The anchor cell or eNB then transmits data for the UE on the physical downlink shared channel (PDSCH) (block 2517). The data is transmitted in one or more resource blocks using dedicated antenna ports. The dedicated reference signal pattern of the one or more resource blocks is based at least partly upon the cell_ID of the anchor cell using dedicated antenna ports.

FIG. 26 illustrates a method 2600 of operating a UE or subscriber station according to an embodiment of this disclosure. The embodiment of the method 2600 illustrated in FIG. 26 is for illustration only. Other embodiments of the method 2600 could be used without departing from the scope of this disclosure.

As shown in FIG. 26, if the UE is to participate in CoMP joint transmission, the UE receives a first indication of a subset of cells or eNBs from the anchor cell or eNB using PDCCH (block 2601). The UE then transmits feedback channel-related information for the subset cells to the anchor cell or eNB (block 2603). In some embodiments, the feedback channel-related information includes inter-channel information between the subset of cells. In particular embodiments, the inter-channel information can include phase-shift information. In some embodiments, the feedback channel-related information is provided to the anchor cell or eNB in a plurality of bit fields in a PUCCH format. The UE then receives a second indication of the actual cells or eNBs that will be participating in the CoMP joint transmission from the anchor cell or eNB using a PDCCH format (block 2605). In some embodiments, the actual cells or eNBs that will be participating in the CoMP joint transmission are indicated using a bitmap. The UE then receives data on the physical downlink shared channel (PDSCH) (block 2607). The data is transmitted in one or more resource blocks using dedicated antenna ports. The dedicated reference signal pattern of the one or more resource blocks is based at least partly upon the cell_ID of the anchor cell using dedicated antenna ports.

Although this disclosure has been described with an exemplary embodiment, various changes and modifications may be suggested to one skilled in the art. It is intended that this disclosure encompass such changes and modifications as fall within the scope of the appended claims.

What is claimed is:

1. A subscriber station comprising:
a receiver configured to:
listen for downlink control information for coordinated multipoint (CoMP) joint transmission only from a base station in an anchor cell that is a current serving base station of the subscriber station,
receive the downlink control information for CoMP joint transmission from the base station in the anchor cell, and
receive data on a physical downlink shared channel (PDSCH), wherein the data is transmitted in one or more resource blocks using dedicated antenna ports, and wherein a dedicated reference signal pattern of the one or more resource blocks is based at least partly upon a cell_ID of the anchor cell.

2. A subscriber station in accordance with claim 1, wherein the anchor cell participates in the CoMP joint transmission by default, and wherein the downlink control information comprises information related to cell_IDs of an active set of cells for the CoMP joint transmission.

3. For use in a wireless communications network, a subscriber station comprising:
a receiver configured to receive a first indication of an active set of cells from an anchor cell; and
a transmitter configured to transmit information related to the active set of cells to the anchor cell,
wherein the receiver is further configured to receive a second indication of a subset of the active set from the anchor cell through a physical downlink control channel (PDCCH), the subset of the active cells being determined by the anchor cell,
wherein the transmitter is further configured to transmit channel related information for the subset of the active cells to the anchor cell, and
wherein the receiver is further configured to receive data on a physical downlink shared channel (PDSCH), wherein the data is transmitted in one or more resource blocks using dedicated antenna ports, and wherein a dedicated reference signal pattern of the one or more resource blocks is based at least partly upon a cell_ID of the anchor cell.

4. A subscriber station in accordance with claim 3, wherein the information related to the active set of cells comprises signal strength information related to the active set of cells.

5. A subscriber station in accordance with claim 3, wherein the information related to the active set of cells comprises an indication of at least one cell from the active set of cells preferred by the subscriber station for coordinated multipoint (CoMP) joint transmission.

6. A subscriber station in accordance with claim 3, wherein the channel related information for the subset of the active cells comprises inter-channel information between the subset of the active cells.

7. A subscriber station in accordance with claim 6, wherein the inter-channel information comprises phase-shift information.

8. A transmitting base station comprising:
a transmitter configured to:
transmit downlink control information for coordinated multipoint (CoMP) joint transmission to a subscriber station, and
transmit data on a physical downlink shared channel (PDSCH),
wherein the transmitting base station is a current serving base station of the subscriber station and the only base station transmitting downlink control information for CoMP joint transmission to the subscriber station, wherein the data is transmitted in one or more resource blocks using dedicated antenna ports, and wherein a dedicated reference signal pattern of the one or more resource blocks is based at least partly upon a cell_ID of the anchor cell.

9. A transmitting base station in accordance with claim 8, and wherein the downlink control information comprises information related to cell_IDs of an active set of cells for the CoMP joint transmission.

10. For use in a wireless communications network, a base station comprising:
a transmitter configured to transmit a first indication of an active set of cells to a subscriber station; and
a receiver configured to receive information related to the active set of cells from the subscriber station,
wherein the transmitter is further configured to transmit a second indication of a subset of the active set to the subscriber station through a physical downlink control channel (PDCCH), the subset of the active cells being determined by the anchor cell,
wherein the receiver is further configured to receive information channel related information for the subset of the active cells from the subscriber station, and
wherein the transmitter is further configured to transmit data on a physical downlink shared channel (PDSCH), wherein the data is transmitted in one or more resource blocks using dedicated antenna ports, and wherein a dedicated reference signal pattern of the one or more resource blocks is based at least partly upon a cell_ID of the anchor cell.

11. A base station in accordance with claim 10, wherein the first indication of the active set of cells comprises one or more bit fields.

12. A base station in accordance with claim 11, wherein the one or more bit fields contain the information related to the cell_IDs of the active set of cells.

13. A base station in accordance with claim 10, wherein the second indication of the subset of the active set comprises a bitmap.

14. A base station in accordance with claim 13, wherein the bitmap comprises a plurality of bit fields with each bit field corresponding a cell in the active set of cells,
wherein a first value in a particular bit field indicates that the cell corresponding to that particular bit field is in the subset of the active set, and
wherein a second value in a particular bit field indicates that the cell corresponding to that particular bit field is not in the subset of the active set.

15. A base station in accordance with claim 10, wherein the second indication of the subset of the active set comprises a flag field.

16. A base station in accordance with claim 15, wherein a first value in the flag field indicates that the subset of the active set comprises all of the cells in the active set of cells, and
wherein a second value in the flag field indicates that the subset of the active set comprises less than all of the cells in the active set of cells.

17. A method of operating a network, the method comprising:
selecting, by an anchor cell, a subset of cells from an active set of cells;
transmitting, by the anchor cell, an indication of the subset of cells to a subscriber station;
transmitting, by the subscriber station, channel-related information for the subset of cells to the anchor cell;

selecting, by the anchor cell, one or more cells from the subset of cells to participate in a coordinated multipoint (CoMP) joint transmission based at least partly upon the channel-related information;

communicating, by the anchor cell, a cell_ID of the anchor cell to the one or more cells that have been selected to participate in the CoMP joint transmission; and determining, by each of the one or more selected cells, a cell-specific frequency shift based on the anchor cell cell_ID, the cell-specific frequency shift for one or more dedicated antenna ports.

18. A method in accordance with claim 17, wherein the indication of the subset of cells is transmitted through a physical downlink control channel (PDCCH).

19. A method in accordance with claim 17 further comprising:

receiving, by the subscriber station, data on a physical downlink shared channel (PDSCH), wherein the data is transmitted in one or more resource blocks using dedicated antenna ports, and wherein the dedicated reference signal pattern of the one or more resource blocks is based at least partly upon the cell_ID of the anchor cell.

20. A method in accordance with claim 17, wherein the channel-related information comprises inter-channel information between the subset of the active cells.

21. A method in accordance with claim 20, wherein the inter-channel information comprises phase-shift information.

22. A method in accordance with claim 17, wherein the subset of cells is selected based at least partly upon feedback from the subscriber station in a physical uplink control channel (PUCCH).

* * * * *